United States Patent
Resnick et al.

(10) Patent No.: US 11,148,820 B1
(45) Date of Patent: Oct. 19, 2021

(54) SYSTEM DEFINING A HYBRID POWER UNIT FOR THRUST GENERATION IN AN AERIAL VEHICLE AND METHOD FOR CONTROLLING THE SAME

(71) Applicant: Parallel Flight Technologies, Inc., Ben Lomond, CA (US)

(72) Inventors: Joshua Resnick, Ben Lomond, CA (US); David Adams, Ben Lomond, CA (US); Robert Hulter, Ben Lomond, CA (US); Seth McGann, Ben Lomond, CA (US); Brian Eiseman, Ben Lomond, CA (US)

(73) Assignee: Parallel Flight Technologies, Inc., Ben Lomond, CA (US)

( * ) Notice: Subject to any disclaimer, the term of this patent is extended or adjusted under 35 U.S.C. 154(b) by 0 days.

(21) Appl. No.: 17/135,735

(22) Filed: Dec. 28, 2020

Related U.S. Application Data

(63) Continuation-in-part of application No. 16/215,011, filed on Dec. 10, 2018.
(Continued)

(51) Int. Cl.
*B64D 31/06* (2006.01)
*B64D 27/24* (2006.01)
(Continued)

(52) U.S. Cl.
CPC ............... *B64D 31/06* (2013.01); *B60L 7/10* (2013.01); *B60L 15/20* (2013.01); *B60L 58/12* (2019.02);
(Continued)

(58) Field of Classification Search
CPC .. B64D 2027/026; B64D 27/24; B64D 31/06; B64D 27/02; B64D 33/08; B64D 27/26;
(Continued)

(56) References Cited

U.S. PATENT DOCUMENTS

| 10,494,117 B2 * | 12/2019 | Bosma | B64D 35/08 |
| 2014/0220873 A1 * | 8/2014 | Bleechmore | F01P 1/06 454/141 |
| 2019/0263519 A1 * | 8/2019 | Argus | B64D 31/06 |

FOREIGN PATENT DOCUMENTS

CN 106741977 * 5/2017

* cited by examiner

*Primary Examiner* — Richard R. Green
*Assistant Examiner* — Ashesh Dangol
(74) *Attorney, Agent, or Firm* — Run8 Patent Group LLC; Peter Miller

(57) ABSTRACT

One variation of a system for generating thrust at an aerial vehicle includes: a primary electric motor; a rotor coupled to the motor; an internal-combustion engine; a clutch interposed between the motor and an output shaft of the internal-combustion engine; an engine shroud defining a shroud inlet between the rotor and the internal-combustion engine, extending over the internal-combustion engine, and defining a shroud outlet opposite the rotor; a cooling fan coupled and configured to displace air through the engine shroud; and a local controller configured to receive a rotor speed command specifying a target rotor speed, adjust a throttle setpoint of the internal-combustion engine according to the target rotor speed and a state of charge of a battery in the aerial vehicle, and drive the primary electric motor to selectively output torque to the rotor and to regeneratively brake the rotor according to the target rotor speed.

12 Claims, 7 Drawing Sheets

Related U.S. Application Data

(60) Provisional application No. 63/007,291, filed on Apr. 8, 2020, provisional application No. 62/967,021, filed on Jan. 28, 2020, provisional application No. 62/632,400, filed on Feb. 19, 2018.

(51) Int. Cl.
| | |
|---|---|
| *B64C 27/32* | (2006.01) |
| *B64D 33/08* | (2006.01) |
| *B60L 7/10* | (2006.01) |
| *B64D 27/26* | (2006.01) |
| *B60L 15/20* | (2006.01) |
| *B60L 58/12* | (2019.01) |
| *B64D 27/02* | (2006.01) |

(52) U.S. Cl.
CPC .............. *B64C 27/32* (2013.01); *B64D 27/24* (2013.01); *B64D 27/26* (2013.01); *B64D 33/08* (2013.01); *B60L 2200/10* (2013.01); *B64D 2027/026* (2013.01)

(58) Field of Classification Search
CPC .. B60L 15/20; B60L 7/10; B60L 58/12; B60L 2200/10; B64C 27/32
See application file for complete search history.

SYSTEM DEFINING A HYBRID POWER UNIT FOR THRUST GENERATION IN AN AERIAL VEHICLE AND METHOD FOR CONTROLLING THE SAME

CROSS-REFERENCE TO RELATED APPLICATIONS

This Application claims the benefit of U.S. Provisional Application No. 62/967,021, filed on 28 Jan. 2020, and U.S. Provisional Application No. 63/007,291, filed on 8 Apr. 2020, each of which is incorporated in its entirety by this reference.

This Application is a continuation-in-part application of U.S. patent application Ser. No. 16/215,011, filed on 10 Dec. 2018, which claims the benefit of U.S. Provisional Application No. 62/632,400, filed on 19 Feb. 2018, each of which is incorporated in its entirety by this reference.

GOVERNMENT LICENSE RIGHTS

This invention was made with government support under Contract No. 80NSSC19C0395 awarded by Small Business Innovation Research (SBIR). The government has certain rights in the Invention.

TECHNICAL FIELD

This invention relates generally to the field of aircraft power unit systems and more specifically to a new and useful system for defining a hybrid power unit for thrust generation in an aerial vehicle and a new and useful method for controlling the same in the field of aircraft power unit systems.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

Figure 1:
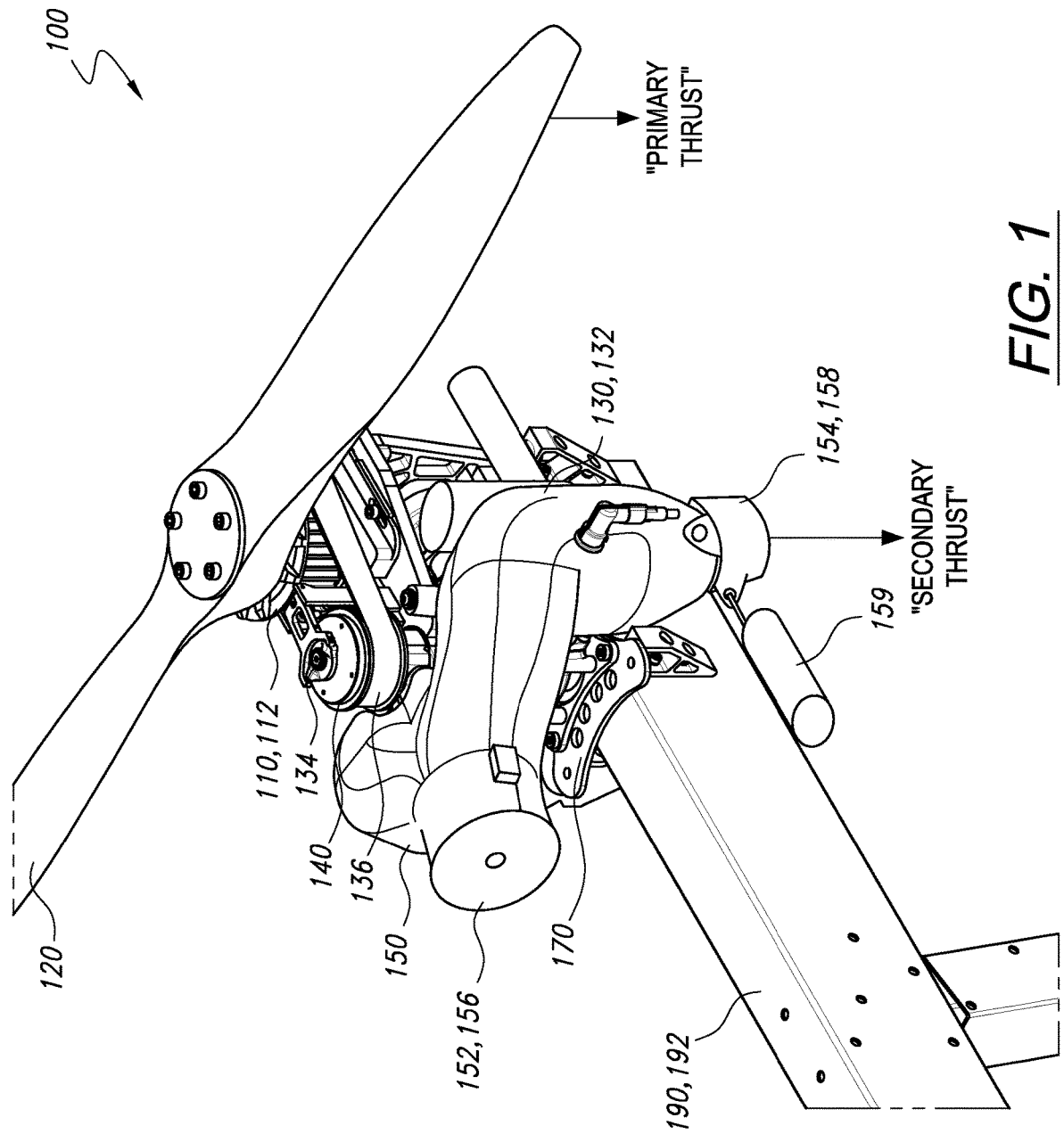
FIG. 1 is a schematic representations of a system.
Figure 2:
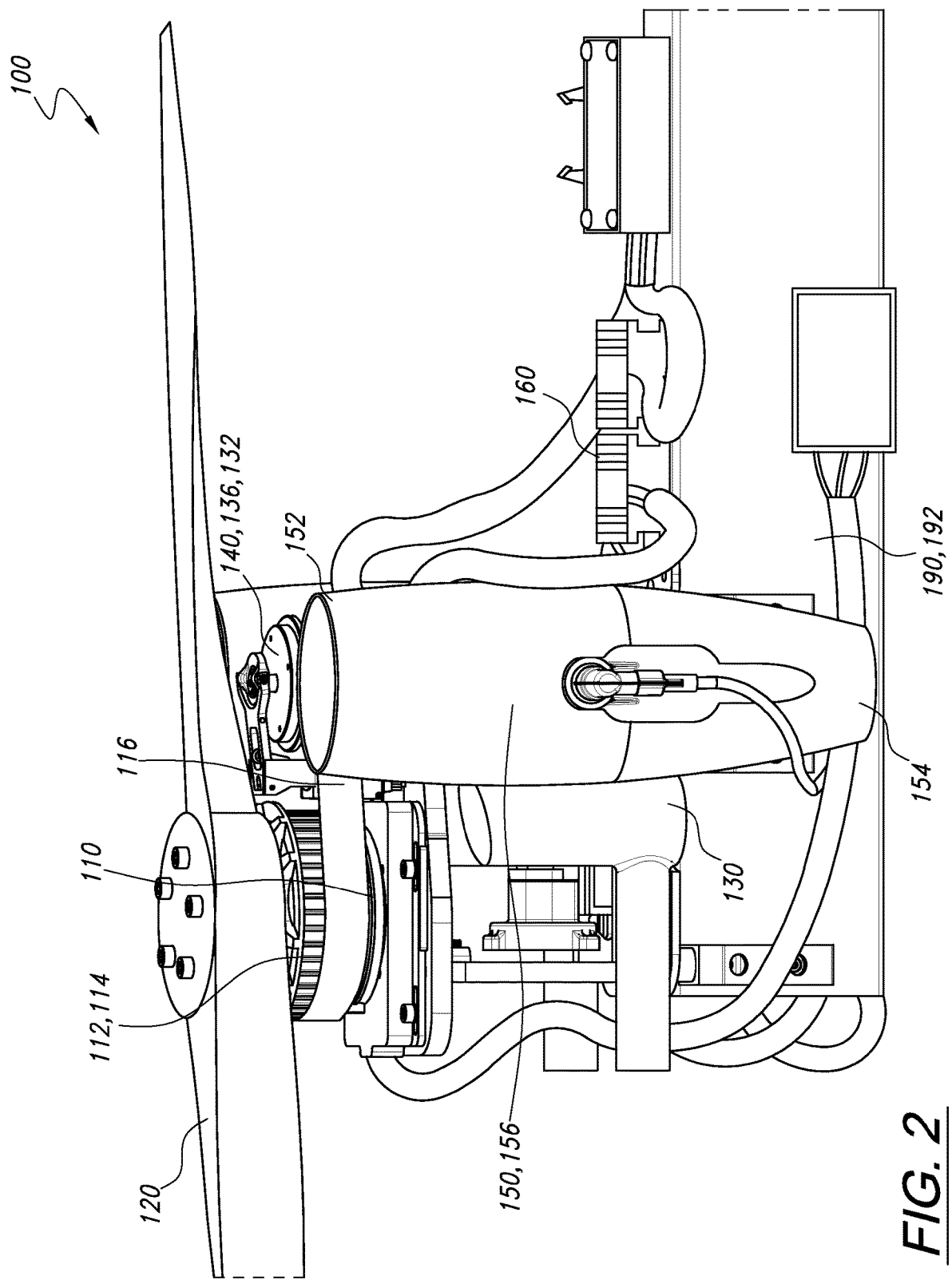
FIG. 2 is a schematic representation of one variation of the system.

As shown in FIGS. 1 and 2, a system 100 defining a hybrid power unit for thrust generation in an aerial vehicle includes: a primary electric motor 110 including a motor output 112; a rotor 120 coupled to the motor output 112; an internal-combustion engine 130 including an output shaft 134 and a cylinder head 132; a clutch 140 interposed between the output shaft 134 and the motor output 112 and configured to selectively transfer torque between the output shaft 134 and the motor output 112; an engine shroud 150 defining a shroud inlet 152 between the rotor and the internal-combustion engine 130, extending over the cylinder head 132, and defining a shroud outlet 154 opposite the rotor; and a cooling fan 156 coupled to the engine shroud 150 and configured to displace air through the engine shroud 150.

The system 100 also includes a local controller 160 configured to: receive a rotor speed command specifying a target rotor speed; adjust a throttle setpoint of the internal-combustion engine 130 according to the target rotor speed and a state of charge of a battery 194 in the aerial vehicle; and drive the primary electric motor 110 to selectively output torque to the rotor 120 and to regeneratively brake the rotor 120 according to the target rotor speed.

In one variation: the rotor 120 is configured to generate a first thrust; and the cooling fan 156 is configured to displace air through the engine shroud 150 to cool the cylinder head 132 and output a second thrust, from the shroud outlet 154, to augment the first thrust. In this variation, the local controller 160 is configured to: access a target total thrust; estimate the second thrust, output from the shroud outlet 154, based on a cooling fan speed of the cooling fan 156; calculate a target rotor speed of the rotor 120 based on the target total thrust and the second thrust; adjust a throttle setpoint of the internal-combustion engine 130 according to the target rotor speed; and drive the primary electric motor 110 to selectively output torque to the rotor 120 and regeneratively brake the rotor 120 according to the target rotor speed.

2. Method

Figure 5:
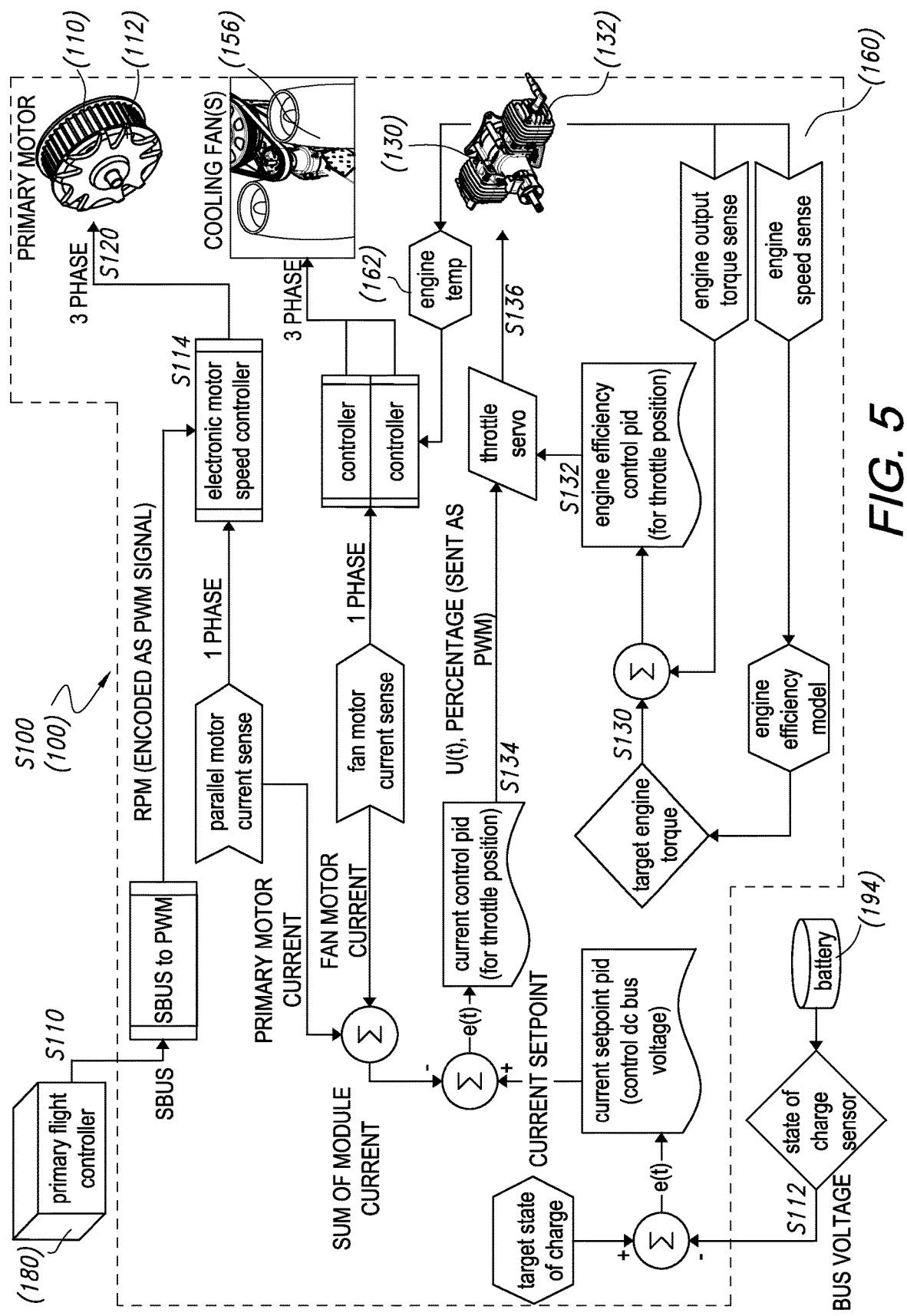
FIG. 5 is a flowchart representation of a method.

As shown in FIG. 5, a method S100 for controlling thrust output of a hybrid power unit in an aerial vehicle includes: receiving a rotor speed command specifying a target rotor speed of a rotor in the aerial vehicle at a first time in Block S110; accessing a first battery state of charge of a battery 194 in the aerial vehicle at approximately the first time in Block S112; and accessing a first rotor speed of the rotor 120 at approximately the first time in Block S114. The method also includes, at a motor speed controller: in response to the first rotor speed exceeding the target rotor speed, braking a primary electric motor 110, coupled to the rotor 120, to drive the rotor 120 to the target rotor speed in Block S120; and, in response to the target rotor speed exceeding the first rotor speed, powering the primary electric motor 110 to drive the rotor 120 to the target rotor speed in Block S120. The method further includes: estimating a first efficiency of an engine coupled to the primary electric motor 110 based on a first engine speed of the internal-combustion engine 130 at approximately the first time and a first engine torque output of the internal-combustion engine 130 at approximately the first time in Block S130; calculating an efficiency-based throttle setpoint delta based on a difference between the first efficiency and a target efficiency of the internal-combustion engine 130 at the first engine speed in Block S132; calculating a charge-based throttle setpoint delta based on a difference between the first battery state of charge and a target battery state of charge in Block S134; and driving a throttle actuator, coupled to an internal combustion engine 130 coupled to the rotor 120, to a new throttle setpoint based on a combination of the efficiency-based throttle setpoint delta and the charge-based throttle setpoint delta in Block S136.

3. Applications

Generally, the system 100 defines a hybrid aircraft power unit configured for installation on an aerial vehicle (e.g., a "drone" or UAV") to produce a controlled amount of thrust via a primary electric motor 110 powered by a battery 194 in the aerial vehicle and via an internal-combustion engine powered by a liquid fuel. The system 100 can execute Blocks of the method S100 to selectively adjust a torque output of the primary electric motor 110 and the internal-combustion engine 130 in order to achieve target total thrust outputs specified by a primary flight controller in the aerial vehicle and to maintain state of change of a battery 194 in the aerial vehicle during a flight.

In particular, the system 100 can include an internal-combustion engine coupled to the rotor 120 and configured to operate on a liquid fuel that exhibits high energy density, thereby enabling the system 100 to produce a large amount of thrust and thus enabling the aerial vehicle to achieve a large payload capacity over an extended flight duration. However, the internal-combustion engine 130 may also be capable of only relatively slow changes in output torque responsive to changes in its throttle setpoint. Therefore, the system 100 can also include a primary electric motor 110—coupled to the rotor 120 and to the internal-combustion engine 130—capable of rapid changes in output torque and thus capable of rapidly accelerating and braking the rotor 120 to a target rotor speed—specified by the primary flight controller—as the output torque of the internal-combustion engine 130 changes over longer timescales responsive to changes in its throttle setpoint. The internal-combustion engine 130 and the primary electric motor 11o can thus cooperate to achieve extended flight times, increase lift and payload capacity, high maneuverability, and robust stability control for an aerial vehicle incorporating one or more instances of the system 100, such as a multi-rotor wingless aerial vehicle (e.g., a "quadcopter").

More specifically, the torque output response time of an internal-combustion engine may be too slow to achieve minimum stability controls and maneuverability for a multi-rotor, wingless aircraft. For example, a two- or four-cycle multi-cylinder gasoline engine may not be capable of a large (e.g., 2×) change in crankshaft speed and/or output torque in a time domain of tens or hundreds of milliseconds, which may otherwise be necessary to maintain control of multi-rotor, wingless aircraft—less than 500 kilograms in total laden weight—in the presence of local air currents and updrafts. Furthermore, an internal-combustion engine: may be more prone to failure than an electric motor; may exhibit peak operating efficiency within a relatively narrow range of output torque and engine speed combinations; but may operate on a liquid fuel characterized by (much) higher energy density than an electric battery 194.

Conversely, the power density of an electric battery 194 can be relatively low such that an increased size of a battery 194 in the aerial vehicle may yield a relatively limited increase in operating time of the primary electric motor 110 while significantly increasing the aerial vehicle's weight and reducing (relatively) the payload capacity of the aerial vehicle. However, the primary electric motor 110: can be capable of large (e.g., 2×) changes in output speed and output torque on very short time scales (e.g., tens or hundreds of milliseconds); can exhibit less tendency for failure and fewer failure modes than the internal-combustion engine; and can operate at or near peak efficiency over a (much) wider range of output torque and motor speed combinations than the internal-combustion engine 130.

Thus, the system 100 can include both the internal-combustion engine and the primary electric motor 110 connected in parallel to a rotor, and the local controller 160 can execute Blocks of the method S100: to achieve rapid changes in rotor speed —responsive to rotor speed commands received from a primary flight controller—by controlling mode and torque output (e.g., torque assistance and regenerative braking) of the primary electric motor 110; and to leverage high energy density of liquid fuels to maintain high thrust output from the rotor 120 and to maintain a target state of charge of the battery 194 over long timescales by automatically adjusting the throttle setpoint of the internal-combustion engine 130. Therefore, the system 100 can execute Blocks of the method S100 in order to: enable a lower-capacity (and therefore lighter) battery 194 to supply power to a larger primary electric motor 110 over longer flight times in an aerial vehicle carrying a greater payload. More specifically, the system 100 can include both the internal-combustion engine and the primary electric motor no connected in parallel to the rotor 120 in order: to limit total system weight while enabling a large range of thrust outputs of the system 100 over long time intervals (e.g., hours) by leveraging high energy capacity of liquid fuel; to achieve rapid rotor speed changes and therefore rapid thrust output changes for tight and consistent stability control by leveraging near-instantaneous changes in torque output of the primary electric motor no; and to maintain the internal-combustion engine 130 near a peak operating efficiency over a range of output thrusts while maintaining a state of charge of the battery 194 in order to extend an operating range of the aerial vehicle by selectively switching the primary electric motor no power output and regenerative braking states.

Furthermore, the system 100 can include: an engine shroud 150 defining a shroud inlet 152 between the rotor 120 and the internal-combustion engine 130, extending around the internal-combustion engine 130, and defining an outlet below the internal-combustion engine 130 opposite the rotor 120; and a cooling fan 156 configured to draw air into the shroud inlet 152, through the shroud to cool the internal-combustion engine 130, and out of the shroud outlet 154 to produce additional thrust augmenting the (primary) thrust generated by the rotor 120. Because the cooling fan 156 is small (relative to the rotor 120), the system 100 can: change the speed of the cooling fan 156 and thus change this secondary thrust output from the shroud outlet 154 over time intervals even shorter than the primary electric motor 110 acting on the rotor 120 in order to achieve even more rapid changes in total thrust output (or "trim") of the system 100; while maintaining an average air flow rate through the shroud—over a longer time interval—sufficient to maintain the internal-combustion engine 130 at a target operating temperature.

the system 100 is described herein as a hybrid power unit configured to install in a vertical orientation (i.e., with axis of rotation of the rotor 120 normal to the ground plane) in a multi-rotor vertical-takeoff-and-landing aircraft, such as in place of a solely-electric power unit. For example, four instances of the system 100 can be installed at each rotor location in a four-rotor "quadcopter." However, the system 100 can be installed in vertical or horizontal orientations in a single- or multi-rotor aircraft of any other configuration.

4. Aerial Vehicle

Figure 3:
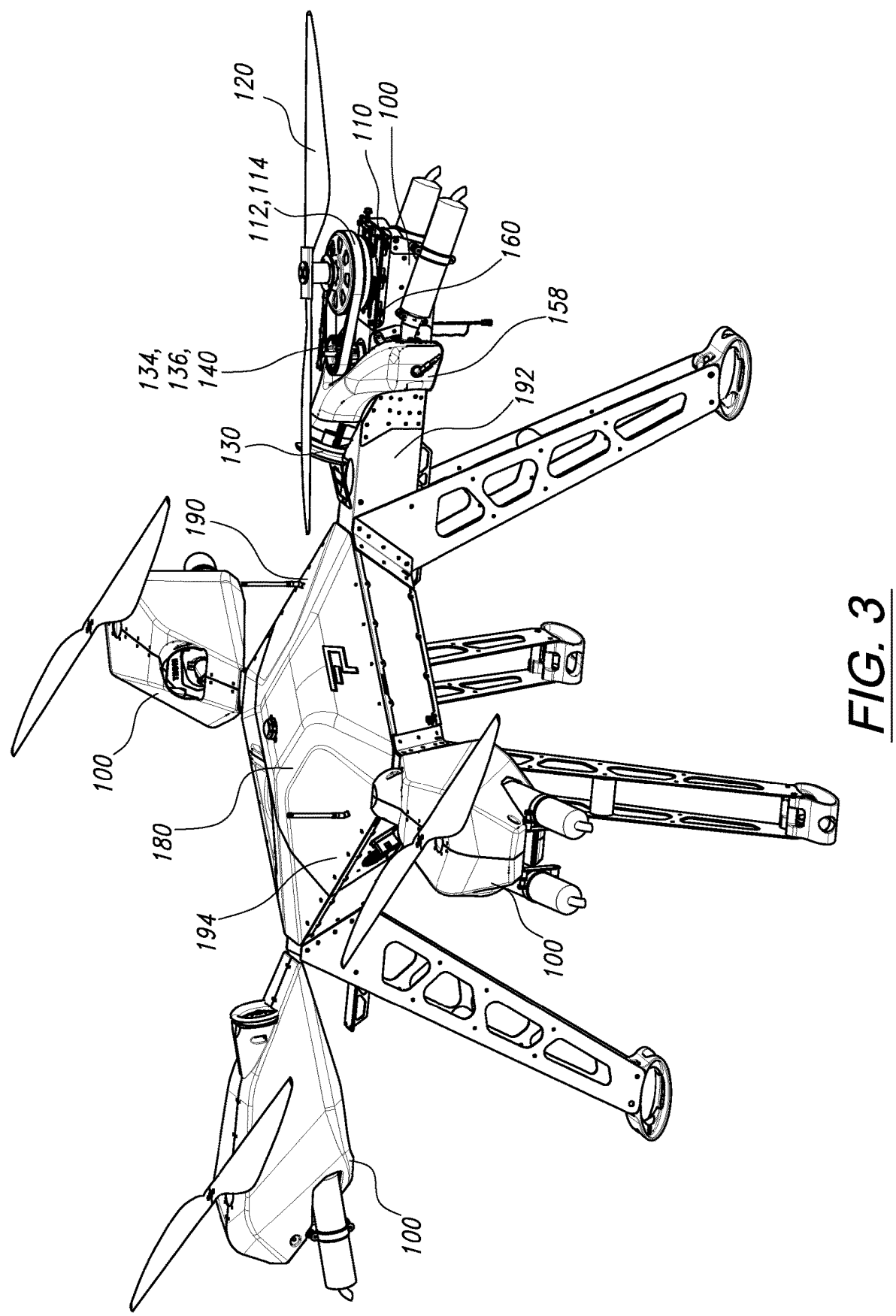
FIG. 3 is a schematic representation of one variation of the system.
Figure 4:
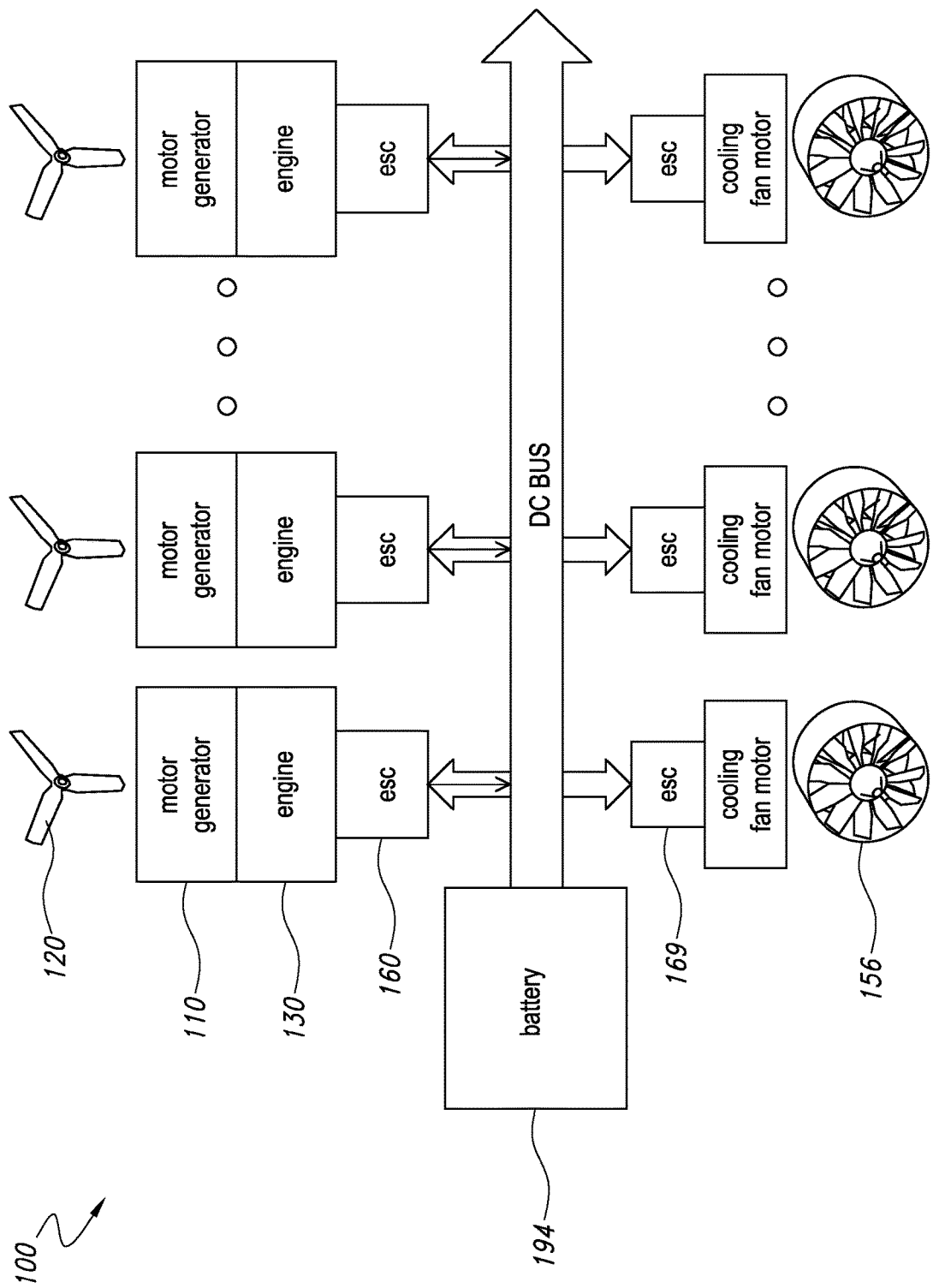
FIG. 4 is a schematic representation of one variation of the system.

As described above and shown in FIG. 3, multiple instances of the system 100 can be installed on or integrated into a multi-rotor, wingless aerial vehicle to generate lift and to maneuver the aerial vehicle.

In one implementation, the multi-rotor aerial vehicle includes: a central hub; a primary flight controller; and a set of rotor booms 192 extending outwardly from the central hub. In this implementation, the central hub can house: a battery 194 and a power bus; a fuel cell and fuel rail; and a data bus and wireless communication module coupled to the primary flight controller. (The aerial vehicle can also include: a camera; a payload mount; and/or a lifting hook; etc.)

For example, the aerial vehicle can include four rotor booms 192 extending outwardly from the central hub by a linear distance of approximately one meter and arranged at a radial offset distance of 90° to form a quadcopter chassis 190 approximately two meters in width. In this example, one instance of the system 100 can be mounted to the distal end of each rotor boom 192. Furthermore, for each instance of the system 100: a power line can be connected between the power bus and the instance of the system 100 to source power to the local controller 160, primary electric motor no, and cooling fan 156 motor in this instance of the system 100; a fuel line can be connected between the fuel rail and an induction system in the internal-combustion engine 130 in this instance of the system 100; and a data line can be connected between the data bus and the local controller 160 in this instance of the system 100 to enable the local controller 160 to receive rotor speed commands from the primary flight controller and to access a state of charge of the battery 194.

Thus, in this example, the system 100 can include a mount 170 (e.g., a molded composite mount, a folded-sheet metal mount) configured to transiently couple to a boom 192 of the aerial vehicle and to locate the rotor 120 in a vertical orientation on the boom 192. The primary electric motor no and the internal-combustion engine 130 are fixed to this mount, and the local controller 160 is similarly is fixed to and/or located within this mount. The primary electric motor 110, the rotor 120, the internal-combustion engine 130, the engine shroud 150, the cooling fan 156, and the local controller 160, etc. can thus form a first power unit mounted to the chassis 190 of the aerial vehicle at a first power unit location. A second instance of the system 100 can similarly form a second power unit mounted to the chassis 190 of the aerial vehicle at a second power unit location.

Therefore, in this implementation, the aerial vehicle can include multiple instances of the system 100, and the local controller 160 (and the electronic motor speed controller) in each instance of the system 100 can execute Blocks of the method S100 to realize target rotor speeds—specified in rotor speed command received from the primary flight controller—on short timescales (e.g., in tens or hundreds of milliseconds). This instance of the system 100 can thus directly supplant a non-hybrid electric aerial vehicle power unit module by ingesting a simple rotor speed command and rapidly executing this rotor speed command.

However, the local controller 160 (and the electronic motor speed controller) in this instance of the system 100 can also execute additional Blocks of the method S100 to control a throttle setpoint of the internal-combustion engine throughout a flight in order to reduce power consumption by the primary electric motor 110, maintain a state of charge of the battery 194, operate the internal-combustion engine 130 near a peak operating (e.g., combustion, thermal) efficiency, and thus extend a range of the aerial vehicle given a prescribed mass of fuel during this flight. Furthermore, by leveraging the primary electric motor 110 to achieve rapid changes in the speed of the rotor 120 (and to smooth torque output of the internal-combustion engine 130) and operating the primary electric motor 110 as a backup drive system for the rotor 120 in the event of an engine failure (e.g., flame out, piston failure, unresponsive fuel injection or carburetor throttle), the system 100 can enable the aerial vehicle to achieve a high degree of maneuverability, efficient and rapid stability control, and long flight times (e.g., two hours) with large payloads (e.g., twice an unladed weight of the aerial vehicle) despite a relatively small (i.e., low-capacity) battery 194.

In the foregoing example, the aerial vehicle can include a battery 194 sized to supply full power to the primary electric motor 110 in each of the four instances of the system 100 in the aerial vehicle—carrying a maximum payload—for a period of five minutes when charged to a target state of charge (e.g., 70% or between 70% and 80% of full battery 194 charge), thereby enabling the aerial vehicle to land from a maximum altitude (e.g., 1,000 meters) following total engine failure in each of the four instances of the system 100. However, in this example, the two-meter-wide aerial vehicle may weigh approximately 50 kilograms when fully fueled for a two-hour flight with a payload twice this fueled weight of the aerial vehicle (i.e., approximately kilograms).

5. Rotor and Driveshaft

As shown in FIGS. 1 and 2, the system 100 includes a rotor, such as a two- or three-blade propeller including fixed-pitch blades. The rotor 120 is mounted to the driveshaft, such as in the form of a stub axle coupled to the output shaft 134 of the primary electric motor 110 or integrated into an external-rotor housing of the primary electric motor 110. Alternatively, the rotor 120 can be mounted directly to the output shaft 134 of the primary electric motor 110 or to the external-rotor housing of the primary electric motor 110.

6. Primary Electric Motor the system 100 also includes a primary electric motor 110, such as a brushed AC or DC electric motor or a permanent-magnet brushless AC or DC electric motor.

Generally, the primary electric motor 110 functions as a motor-generator and can be sized to output a maximum torque sufficient to fulfill thrust requirements of the system 100 for a configuration of the aerial vehicle in which the system 100 is installed. For example, the primary electric motor no can be sized to produce a maximum thrust equal to one-quarter of the total maximum loaded weight of the aerial vehicle plus a safety factor (e.g., 33%). For example, for the aerial vehicle that defines a quad-copter with four instances of the system 100, weighing 50 kilograms, and rated for a maximum payload of kilograms, as described above, the primary electric motor 110—in each of the four instances of the system 100 installed in this aerial vehicle— can be sized to produce a maximum thrust of 500 Newtons when paired with the fixed rotor. Thus, if one of these four instances of the system 100 fails completely and if the internal-combustion engine 130 in one of the remaining three instances of the system 100 also fails, the three primary electric motors 110 in each of these three instances of the system 100 can maintain the aerial vehicle airborne when the aerial vehicle is fully loaded.

the system 100 can also include an electronic motor speed controller interposed between the primary flight controller (or the local controller 160) and the primary electric motor 110. Upon receipt of a rotor speed command from the primary flight controller (or from the local controller 160), the electronic communication can implement closed-loop controls to automatically adjust a voltage and/or commutation to the primary electric motor 110 to rapidly drive the rotor 120 to a new target rotor speed specified in this rotor speed command and to then maintain the rotor 120 at this target motor speed until a new command—specifying a different target motor speed—is received from the primary flight controller (or from the local controller 160). For example, to accelerate the rotor 120 responsive to a rotor speed command specifying a higher target rotor speed, the electronic motor speed controller can increase a voltage and commutation speed of the primary electric motor 110. Conversely, to decelerate the rotor 120 responsive to a rotor speed command specifying a lower target rotor speed, the electronic motor speed controller can transition the primary electric motor 110 into a generate mode to regeneratively brake the rotor 120.

7. Engine and Clutch

The system 100 also includes an internal-combustion engine coupled to the primary electric motor 110 and the rotor 120 via a clutch 140.

In one implementation, the internal-combustion engine 130 includes a fuel-injected, air-cooled horizontally-opposed (or "flat"), two-cylinder, internal-combustion, gasoline engine mounted in the system 100 with the axis of its crankshaft parallel to and offset from the rotational axis of the rotor 120 and primary electric motor 110. However, the internal-combustion engine 130 can include a single-cylinder or multi-cylinder internal-combustion engine with cylinders in any other format or arrangement and configured to operate on any other type of liquid fuel (e.g., nitro methane, alcohol). Yet alternatively, the internal-combustion engine 130 can include a rotary, radial, turbine, or other type of internal-combustion engine.

Figure 8:
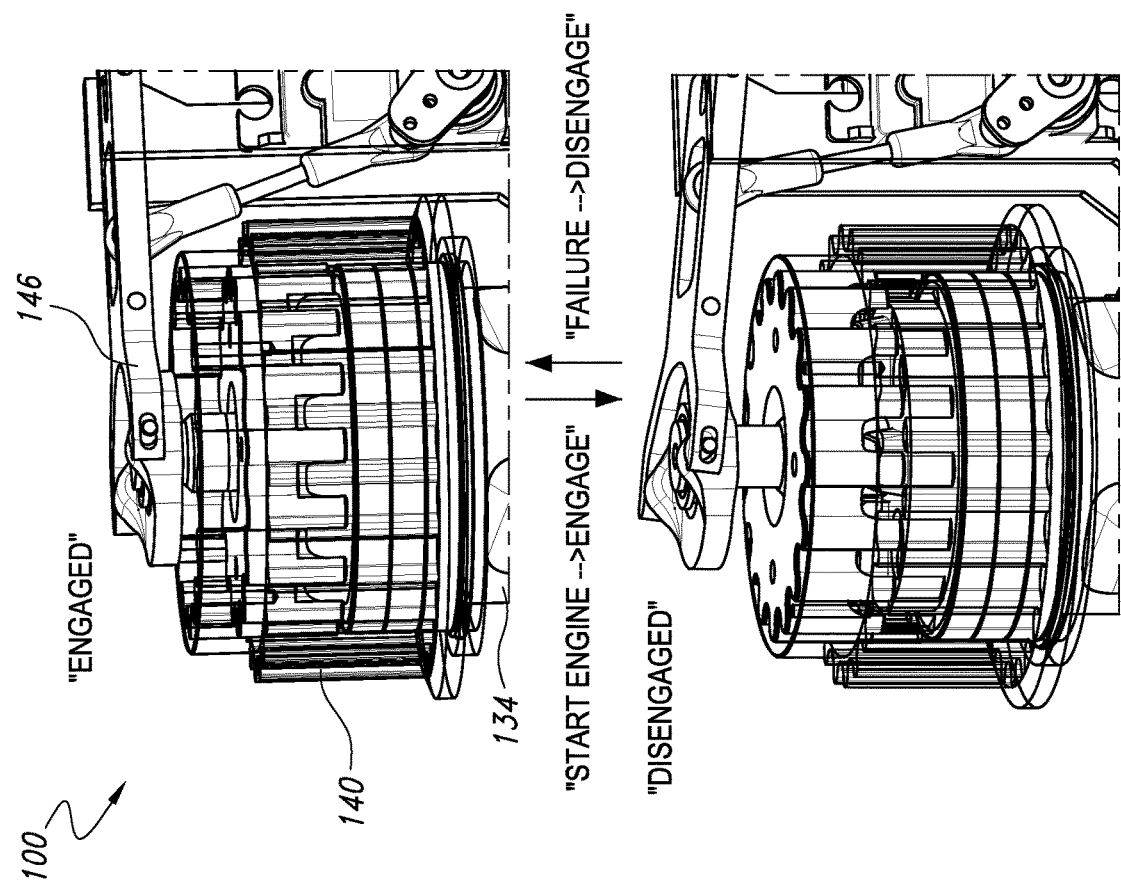
FIG. 8 is a schematic representation of one variation of the system.

As shown in FIGS. 1, 2, and 8 the clutch 140 is interposed between the internal-combustion engine 130 and the rotor 120 and is configured to selectively: couple (or "engage") the output shaft 134 of the internal-combustion engine 130 to the rotor 120; and decouple (or "disengage") the output shaft 134 of the internal-combustion engine 130 from the rotor 120. For example, the clutch 140 can include: a two-way dog clutch mounted to the output shaft 134 of the internal-combustion engine 130; and a clutch body defining an engine-side pulley 136. In this example, the motor output 112 of the primary electric motor no can be coupled to or can define (e.g., can be physically coextensive with) a motor-side pulley 114; and the system 100 can further include a belt 116 (e.g., a timing or v-groove belt) coupling the engine-side pulley 136 to the motor-side pulley 114. In this example, the system 100 can also include a clutch actuator 146 (e.g., a solenoid) configured to selectively engage and disengage the clutch 140. In particular, the local controller 160 can trigger the clutch actuator 146 to engage the clutch 140 to couple the output shaft 134 of the internal-combustion engine 130 to the rotor 120: when the primary electric motor no is actuated to start the internal-combustion engine 130 at the beginning of a flight; and during a flight when the internal-combustion engine 130 is operated to directly drive the rotor 120. In this example, the local controller 160 can similarly trigger the clutch actuator 146 to disengage the clutch 140 to decouple the output shaft 134 of the internal-combustion engine 130 from the rotor 120: responsive to an engine failure in order to reduce drag on the rotor 120 as the local controller 160 and the electronic motor speed controller transition to driving the rotor 120 exclusively with the primary electric motor no; and during takeoff and landing procedures in order to reduce rotating mass of the rotor 120, engine, and primary electric motor 110 assembly and thus enable shorter response times to control commands received from the primary flight controller during these higher-risk maneuvers.

7.1 Dog Clutch and Emergency Clutch Disengagement

Figure 7:
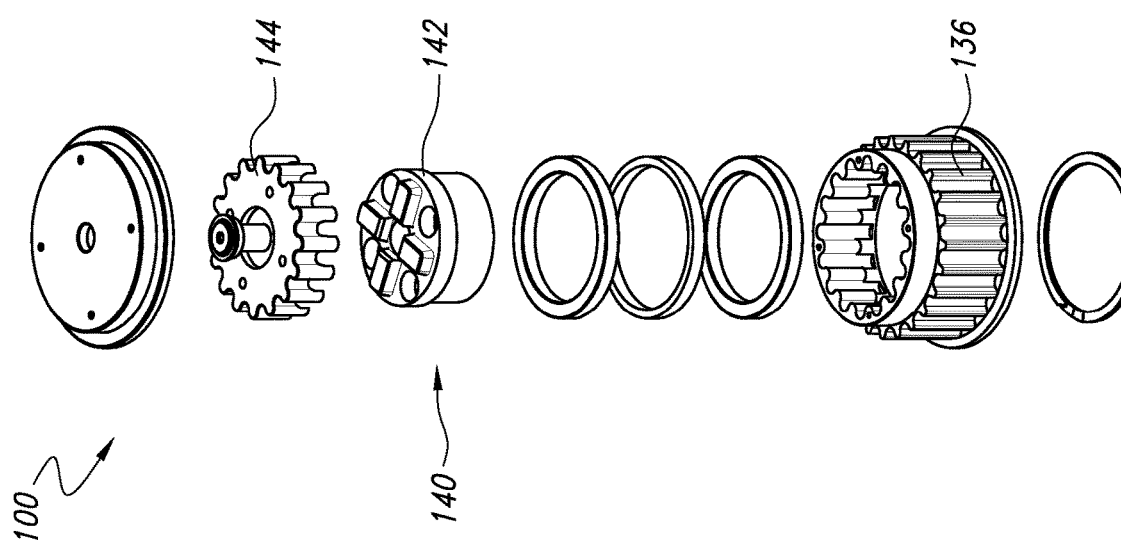
FIG. 7 is a schematic representation of one variation of the system.

In one implementation shown in FIGS. 7 and 8 and described above, the clutch 140 includes a two-way dog clutch configured to transfer torque between the internal-combustion engine 130 and primary electric motor 110. In this implementation, during a start cycle, the local controller 160 can trigger the clutch actuator 146 to engage the clutch 140 and then actuate the primary electric motor 110 to start the internal-combustion engine 130 before takeoff. Alternatively, the local controller 160 can trigger the clutch actuator 146 to engage the clutch 140 and then actuate the primary electric motor 110—with the internal-combustion engine 130 rotating but inactive—during a takeoff procedure; once the aerial vehicle reaches a minimum altitude (e.g., 10 meters), the local controller 160 can activate a spark or glow plug in the internal-combustion engine 130 and/or increase the throttle setpoint of the internal-combustion engine 130 in order to start the internal-combustion engine 130. Once the internal-combustion engine 130 is started and throughout subsequent missions executed by the aerial vehicle, the local controller 160 can maintain the clutch 140 in this "engaged" position, modulate the throttle setpoint of the internal-combustion engine 130, selectively transition the primary electric motor 110 between torque output and regenerative braking states, and modulate the torque output of the primary electric motor 110—in the torque output state—in order to control the thrust generated by the rotor 120 according to commands received from the primary flight controller 180.

Once the aerial vehicle completes this mission and a landing, the local controller 160 can trigger the clutch actuator 146 to disengage the clutch 140, thereby separating the clutch 140 for storage (e.g., to prevent corrosion and cohesion of the clutch 140 due to long-term contact between the dogs 142 and dog receivers 144 in the clutch 140) and/or to enable the internal-combustion engine 130 to be serviced separately from the primary electric motor 110. Alternatively, as the aerial vehicle prepares to land—such as once the aerial vehicle descends to a minimum altitude (e.g., 10 meters)—the local controller 160 can: trigger the clutch actuator 146 to disengage the clutch 140; and deactivate the internal-combustion engine 130 (e.g., by deactivating a spark or a glow plug in the internal-combustion engine 130) while modulating the torque output of the primary electric motor 110—in the torque output state—in order to control the thrust generated by the rotor 120 according to commands received from the primary flight controller 180 as the aerial vehicle lands and without drag from the internal-combustion engine 130.

Furthermore, in this implementation, in response to detecting a failure at the internal-combustion engine 130, the local controller 160 can: (transition the motor into the torque output state;) trigger the clutch actuator 146 to disengage the clutch 140; and drive the primary electric motor 110 to increase torque output by the primary electric motor 110 to the rotor 120 (i.e., to compensate for loss of power transmission from the internal-combustion engine 130). For example, the controller can detect a failure at the internal-combustion engine 130 in response to: a rapid increase in power demand from the primary electric motor 110 to maintain a target speed of the rotor 120; and then no or minimal reduction in power demand from the primary electric motor 110 to maintain the target speed following (i.e., despite) large increases in the throttle setpoint of the internal-combustion engine 130. (In this example, after triggering disengagement of the clutch 140, the local controller 160 can also: power the primary electric motor 110—via the battery 194—to drive the rotor 120 to target rotor speeds received from the primary flight controller 180 for a backup power duration (e.g., up to five minutes) supported by the battery 194 at the target battery state of charge (e.g., between 70% and 80% of full battery 194 charge); generate a command or prompt to land the aerial vehicle within the backup power duration; and return this command to the primary flight controller 180, which can autonomously land the aerial vehicle according to the command or return the prompt to a human operator.)

Additionally or alternatively, in this implementation, to reengage the clutch 140 with the internal-combustion engine 130 stopped while the aerial vehicle is in flight, the local controller 160 can: stop the primary electric motor 110 while the primary flight controller 180 interfaces with other power units in the aerial vehicle to increase total thrust output; trigger the clutch actuator 146 to engage the clutch 140; and then actuate the primary electric motor 110 to start the internal-combustion engine 130. Similarly, in this implementation, to reengage the clutch 140 with the internal-combustion engine 130 active while the aerial vehicle is in flight, the local controller 160 can: drive the primary electric motor 110 and the internal-combustion engine 130 to an angular speed while the primary flight controller 180 interfaces with other power units in the aerial vehicle to maintain a total, balanced thrust output of the aerial vehicle; and then trigger the clutch actuator 146 to engage the clutch 140.

7.2 Timed Clutch Engagement/Disengagement

In one variation, the local controller 160 tracks angular positions of the internal-combustion engine 130 output shaft 134 and the clutch 140 and times of engagement of the clutch 140 by the clutch actuator 146 in order to align the dogs 142 of the clutch 140 to their corresponding dog receivers 144 in order to enable in-flight re-engagement of the clutch 140 when the input and output sides of the clutch 140 (e.g., the internal-combustion engine 130 output shaft 134 and the engine-side pulley 136 connected to the primary electric motor 110) are at different speeds (e.g., when the internal-combustion engine 130 is stopped mid-flight, such as to reduce fuel consumption and/or reduce noise generated by the aerial vehicle).

In this variation, the system 100 can include: a first angular position sensor coupled to the internal-combustion engine 130 output shaft 134; and a second angular position sensor coupled to the output side of the clutch 140 (or to the primary electric motor 110, the rotor 120). During normal flight operation, the local controller 160 can trigger the clutch actuator 146 to disengage the clutch 140 and then deactivate the internal-combustion engine 130, such as: when the current state of charge of the battery 194 in the aerial vehicle exceeds the target state of charge (e.g., in order to reduce rotating resistance of the rotor 120 as the primary electric motor 110—powered by the battery 194—drives the rotor 120 to a target rotor speed); and/or when noise generated by the aerial vehicle exceeds a local noise limit. As the battery state of charge drops below the target battery state of charge, the controller can: detect the current position of the internal-combustion engine 130 output shaft 134 via the first angular position sensor; track the current position and angular speed of the output side of the clutch 140 via the second angular position sensor; retrieve a clutch engagement time (e.g., from local memory) representing a nominal (e.g., average) duration of time for the clutch actuator 146 to transition the clutch 140 from the current disengaged position to a minimum engagement position; calculate an angular distance traversed by the clutch 140 output relative to the internal-combustion engine 130 output shaft 134 over the clutch 140 engagement time based on the current angular speed of the clutch 140 output; retrieve an angular offset (e.g., 0°, 90°, 180° or 270° for a four-dog clutch) between the engine output shaft 134 and the clutch 140 output in which the dogs 142 of the clutch 140 align with corresponding receivers in the clutch 140; and calculate an angular clutch actuator 146 trigger position by subtracting the angular distance from the angular offset. (The local controller 160 can also correct the angular clutch actuator 146 trigger position by a stored calibration value tuned for the particular clutch and clutch actuator 146.) The local controller 160 can then trigger the clutch actuator 146 to engage the clutch 140 when the clutch 140 output reaches the angular clutch actuator 146 trigger position, thereby enabling the dogs 142 to align with the receivers in the clutch 140 as the clutch 140 engages and reducing or eliminating bounce and slippage within the clutch 140 during engagement.

In one implementation in which the aerial vehicle includes multiple (e.g., four) power units, the local controller 160 can also reduce the speed of the rotor 120 (e.g., by reducing the voltage across the primary electric motor no) in order to reduce an angular speed difference (or "mismatch") between the internal-combustion engine 130 output shaft 134 and the clutch 140 output, thereby reducing impact and wear between the dogs 142 and dog receivers 144 in the clutch 140. In this implementation, the primary flight controller 180 and local controllers 160 in the other power units can compensate for the reduction in output thrust of this power unit by similarly reducing the speed of a rotor in a second, opposing power unit and increasing speeds of the rotors in the remaining (e.g., third and fourth) power units in the aerial vehicle.

Thus, in this variation, the local controller 160 can time actuation of the clutch actuator 146 based on performance of the clutch actuator 146, the geometry of the clutch 140, and the speed of the internal-combustion engine 130 output shaft 134 and the clutch 140 output in order to selectively re-engage the clutch 140 during operation, such as after stopping the internal-combustion engine 130 during flight.

7.3 Other Clutch Systems

However, the clutch 140 can additionally or alternatively include a friction clutch (e.g., a single-plate or multi-plate clutch), a conical-spring (or "diaphragm" clutch), or any other type of clutch. In this implementation, the input side of the clutch 140 can be mounted to the output shaft 134 of the internal-combustion engine 130, and the output side of the clutch 140 can include a second pulley 136 of a first radius. Furthermore, in this implementation, a first pulley 114 can be mounted to or integrated into the external-rotor of the primary electric motor no (i.e., between the rotor 120 and the primary electric motor 110); and a belt 116 can couple the first and second pulleys 114, 136, thereby coupling the internal-combustion engine 130 and the clutch 140 to the primary electric motor no and the rotor 120.

In other variations, the internal-combustion engine 130 includes a gas turbine or other type of internal-combustion engine and is coupled to the primary electric motor no and to the rotor 120 via a geared transmission, a bevel-drive, a constant-velocity transmission, or other power transmission subsystem.

8. Cooling Fan and Engine Shroud the system 100 also includes: an engine shroud 150 arranged about the internal-combustion engine 130; and a cooling fan 156 configured to force air through the engine shroud 150 in order to cool the internal-combustion engine 130 and/or to increase a total thrust output of the system 100.

In one implementation shown in FIG. 5, the system 100 includes one discrete engine shroud 150 arranged over each cylinder head 132 (or cylinder bank) of the internal-combustion engine 130 and extending above and below the cylinder head 132 (or cylinder bank) parallel to the crankshaft of the internal-combustion engine 130. In this implementation, the system 100 also includes one cooling fan 156 arranged in each engine shroud 150, and each cooling fan 156 can thus draw air from above the internal-combustion engine 130, into the shroud inlet 152 of the corresponding engine shroud 150, over the corresponding cylinder head 132 of the internal-combustion engine 130, and out of the shroud outlet 154 of the engine shroud 150 below to both cool this cylinder head 132 and output thrust.

Alternatively, the system 100 can include a manifold coupling the shroud inlets 152 of these engine shrouds 150 to a common inlet extending laterally (i.e., substantially perpendicular to the axis of rotation of the rotor 120) over a rotor boom 192 and toward a central hub of the aerial vehicle, shown in FIG. 1. In this implementation, the system 100 can include a single cooling fan 156 arranged across or near the common inlet in the manifold and can draw air—above the internal-combustion engine 130—laterally into the shroud inlet 152 of the manifold, over the cylinder heads 132 of the internal-combustion engine 130, and out of the shroud outlets 154 of the engine shroud 150 in order to cool the internal-combustion engine 130 and/or increase the total thrust output by the system 100.

However, the engine shroud 150 can define any other form or geometry, and the system 100 can include any other configuration of cooling fans 156 configured to draw air through the engine shroud 150.

9. Controls the system 100 also includes a local controller 160 configured to execute Blocks of the method S100 to control a total thrust output of the system 100, a temperature and efficiency of the internal-combustion engine 130, and current (or electrical power) flux through the system 100, as shown in FIG. 5. In particular, the controller can be arranged in a housing within the system 100 and can cooperate with the electronic motor speed controller to set a speed of the primary electric motor 110, set a throttle setpoint of the internal-combustion engine 130, a set a speed of the cooling fan 156(s) based on: a rotor speed command received from the primary flight controller in the aerial vehicle; a state of charge of a battery 194 in the aerial vehicle (e.g., received from the primary flight controller or read directly from this battery 194); and various sensor data (e.g., a temperature of the internal-combustion engine 130).

9.1 Target Rotor Speed Command

Block Silo of the method S100 recites receiving a rotor speed command specifying a target rotor speed at a first time. Generally, in Block Silo, the system 100 can receive rotor speed commands from the primary flight controller, such as on a regular interval of 10 Hz (i.e., ten control cycles per second), as shown in FIG. 5.

In one implementation, the electronic motor speed controller receives a rotor speed command directly from the primary flight controller (e.g., via a data bus in the aerial vehicle) during a command cycle and automatically passes this rotor speed command to the local controller 160 while executing methods described below to drive the primary electric motor 110 to the specified target rotor speed.

In one variation, the local controller 160 receives a thrust command—specifying a target thrust output of the system 100—from the primary flight controller during a command cycle, converts this thrust command into a target rotor speed based on a current altitude of the aerial vehicle, and then passes this target rotor speed to the electronic motor speed controller for immediate execution.

However, the local controller 160 can receive or calculate a target rotor speed in any other way in Block Silo.

9.2 Rotor Speed Command and Electronic Motor Speed Controller

Block S120 of the method S100 recites, at an electronic motor speed controller, driving a primary electric motor 110, coupled to the rotor 120, to the target rotor speed. Generally, upon receipt of the target rotor speed during a command cycle, the electronic motor speed controller can implement closed-loop controls to automatically adjust torque output and regenerative braking settings of the primary electric motor 110 in order to rapidly achieve and then maintain this target motor speed in Block S120.

In one example, if the current rotor speed is less than the target rotor speed and if the primary electric motor 110 is currently in an output mode, the electronic motor speed controller can increase a voltage (e.g., an average voltage within a pulse-width-modulated power signal) across the primary electric motor 110 in order to increase the speed of the rotor 120. However, if the current rotor speed is less than the target rotor speed and if the primary electric motor 110 is currently in a generator mode, the electronic motor speed controller can: decrease a regenerative braking setpoint of the primary electric motor no in order to decrease torque resistance against the internal-combustion engine 130 and thus enable the internal-combustion engine 130 to increase the speed of the rotor 120 given its current throttle setpoint, such as if the current rotor speed is slightly (e.g., 2%) less than the target rotor speed; or transition the primary electric motor no into the output mode and increase the voltage across the primary electric motor no to assist the primary electric motor no in increasing the speed of the rotor 120, such as if the current rotor speed is significantly (e.g., more than 2%) less than the target rotor speed Conversely, if the current rotor speed is more than the target rotor speed and if the primary electric motor no is currently in the output mode, the electronic motor speed controller can: decrease the voltage across the primary electric motor no in order to decrease the speed of the rotor 120, such as if the current rotor speed is slightly (e.g., less 50 rpm) more than the target rotor speed; or transition the primary electric motor no into the generator mode in order to regeneratively brake the primary electric motor no and thus rapidly decrease the speed of the rotor 120, such as if the current rotor speed is significantly (e.g., more than 2%) more than the target rotor speed. However, if the current rotor speed is more than the target rotor speed and if the primary electric motor no is currently in the generator mode, the electronic motor speed controller can increase the regenerative braking setpoint of the primary electric motor 110 in order to increase torque resistance against the internal-combustion engine 130 and thus slow the rotor 120.

9.3 Engine Efficiency

Block S130 of the method S100 recites estimating a first efficiency of an engine coupled to the primary electric motor no based on a first engine speed of the internal-combustion engine 130 at approximately the first time and a first engine torque output of the internal-combustion engine 130 at approximately the first time. Generally, during the command cycle, the local controller 160 can also estimate a total instantaneous rotor input torque, an instantaneous torque output of the primary electric motor no, and an instantaneous output torque of the internal-combustion engine 130 during this command cycle, as shown in FIGS. 5 and 6.

In one implementation, the local controller 160: accesses a rotor model that links altitude of the aerial vehicle (which corresponds to air density) and rotor speed to total rotor input torque for the configuration of the rotor 120 (e.g., the current pitch of the blades of the rotor 120); and queries this rotor model for a total rotor input torque based on the current altitude of the aerial vehicle and the current speed of the rotor 120. The local controller 160 can also: access (e.g., from the electronic motor speed controller) a voltage across the primary electric motor no (which is a positive value regardless of the mode of the primary electric motor no because the system 100 rotates the primary electric motor no in only one direction during operation); access an electrical current through the primary electric motor no (which is a positive value when the primary electric motor no is in the output mode and a negative value when in the generator mode); multiply this voltage by this electrical current to calculate a power output of the motor (which is a positive value when the primary electric motor 110 is in the output mode and a negative value when the primary electric motor 110 is in the generator mode); and then divide this power output by the current speed of the primary electric motor 110 (or the rotor 120) to calculate an instantaneous torque output of the primary electric motor 110 (which is a positive value when the motor is in the output mode and a negative value when the motor is in the generator mode). The local controller 160 can then calculate the instantaneous torque output of the internal-combustion engine 130 by subtracting the instantaneous torque output of the primary electric motor 110 from the total rotor input torque for the current command cycle.

Alternatively, the local controller 160 can measure the current torque output of the internal-combustion engine 130 directly via a torque sensor coupled to the internal-combustion engine 130, such as arranged between the internal-combustion engine 130 and clutch.

Figure 6:
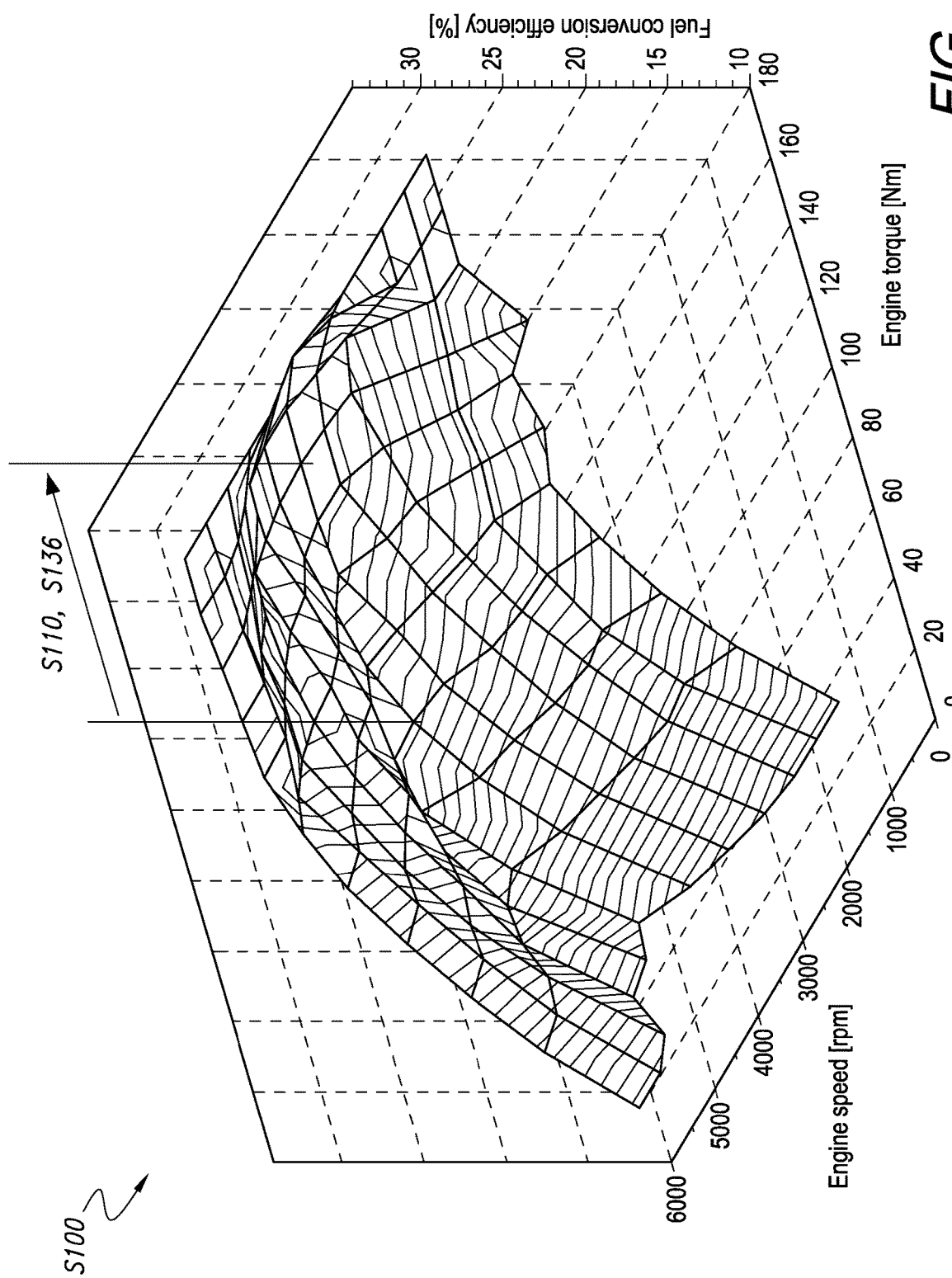
FIG. 6 is a graphical representation of one variation of the method.

The local controller 160 can then: calculate a speed of the internal-combustion engine 130 based on a current speed of the primary electric motor no and a known drive ratio between the internal-combustion engine 130 and the primary electric motor no; retrieve a stored engine efficiency curve (or "map") for an engine at or near the current engine speed (as shown in FIG. 6); and query this engine efficiency curve for an estimated efficiency of the internal-combustion engine 130 during the current command cycle based on the current torque output of the internal-combustion engine 130.

In another implementation, the local controller 160 can pass a current throttle setpoint, the current engine speed, the instantaneous speed of the rotor 120, and an instantaneous output current of the primary electric motor no (which represents a resistive torque output of the primary electric motor 110 when the primary electric motor 110 is regeneratively braking the rotor 120 and an assistive torque output of the primary electric motor 110 when the primary electric motor 110 is in the output mode) into a stored engine efficiency model in order to directly estimate the efficiency of the internal-combustion engine 130 during this command cycle.

However, the local controller 160 can implement any other method or technique to estimate the current efficiency of the internal-combustion engine 130.

9.4 Efficiency-Based Throttle Setpoint Delta

Block S132 of the method S100 recites calculating an efficiency-based throttle setpoint delta based on a difference between the first efficiency and a peak efficiency of the internal-combustion engine 130 at the first engine speed. Generally, in Block S132, the local controller 160 can calculate a change in the throttle setpoint of the internal-combustion engine 130 predicted to increase the operating efficiency of the internal-combustion engine 130.

In one implementation, the local controller 160: retrieves a stored engine efficiency curve for an engine at or near the current engine speed; reads or calculates the current operating efficiency of the internal-combustion engine 130 based on this engine efficiency curve and the instantaneous torque output of the internal-combustion engine 130, as described above, and then reads or calculates a target torque output of the internal-combustion engine 130—predicted to yield a peak engine efficiency at (or near) the current engine speed—from this engine efficiency curve.

The local controller 160 then calculates an efficiency-based throttle setpoint delta as a function of (e.g., proportional to) the difference between the actual and target torque outputs of the internal-combustion engine 130 for the current engine speed during the current command cycle. For example, the local controller 160 can calculate a negative efficiency-based throttle setpoint delta if the actual torque output of the internal-combustion engine 130 exceeds the target torque output for the current engine speed; and vice versa.

9.5 Charge-Based Throttle Setpoint Delta

Block S134 of the method S100 recites calculating a charge-based throttle setpoint delta based on a difference between the first battery state of charge and a target battery state of charge.

In one implementation, the local controller 160: reads or accesses the current state of charge of the battery 194; and retrieves or calculates a target charge state of the battery 194. In particular, the local controller 160 can implement a target charge state of the battery 194 that is less than fully-charged (or "100%") in order to enable battery 194 headroom for the primary electric motor 110 to slow the rotor 120 and engine through regenerative braking by dumping captured energy from the internal-combustion engine 130 and rotor into the battery 194 without overcharging the battery 194. For example, the local controller 160 can implement a fixed target state of charge, such as 75%. Alternatively, the local controller 160 can calculate a target state of charge for the current flight or for the current control cycle. For example, the local controller 160 can calculate a target state of charge for the current flight: proportional to a current payload of the aerial vehicle; and/or inversely proportional to a remaining flight time for the current flight (e.g., because the battery 194 may be recharged at lower cost with fixed ground-based infrastructure rather than by the internal-combustion engine 130).

The local controller 160 can then calculate a target total current draw from the battery 194 based on a difference between the actual and target states of charge of the battery 194. For example, the local controller 160 can calculate a target total current draw—for the current command cycle— that is: proportional to a difference between the actual and target state of change of the battery 194; negative if the actual state of change is less than the target state of change; and positive if the actual state of change is more than the target state of change.

The local controller 160 can then calculate a charge-based throttle setpoint delta for the internal-combustion engine 130 as a function of (e.g., inversely proportional to) the target total current draw. For example, the local controller 160 can calculate a positive throttle setpoint delta if the target total current draw is negative such that implementation of this positive throttle setpoint delta increases the output torque of the internal-combustion engine 130, increases regenerative braking of the primary electric motor 110 in order to maintain the rotor 120 at a current target rotor speed, and thus increases current output of the primary electric motor 110 to recharge the battery 194. Conversely, the local controller 160 can calculate a negative throttle setpoint delta if the target total current draw is positive such that implementation of this negative throttle setpoint delta decreases the output torque of the internal-combustion engine 130, increases a torque output of the primary electric motor no in order to maintain the rotor 120 at a current target rotor speed, and thus increases current draw of the primary electric motor no to reduce the charge state of the battery 194.

9.6 Temperature-Based Throttle Setpoint Delta

In one variation, the local controller 160 can also: read or access a temperature of the internal-combustion engine 130 from a temperature sensor 162 coupled to the internal-combustion engine 130; and calculate a temperature-based throttle setpoint delta as a function of (e.g., proportional to) a difference between the current engine temperature and a target operating temperature of the internal-combustion engine 130. For example, the local controller 160 can calculate a negative temperature-based throttle setpoint delta if the current engine temperature exceeds the target operating temperature of the internal-combustion engine 130; and vice versa.

9.7 Throttle Setpoint Adjustment

Block S136 of the method S100 recites driving a throttle actuator, coupled to an internal-combustion engine coupled to the rotor 120, to a new throttle setpoint based on a combination of the efficiency-based throttle setpoint delta and the charge-based throttle setpoint delta in Block S136.

In one implementation, the local controller 160 can merge the efficiency-based throttle setpoint delta, the charge-based throttle setpoint delta, and/or the temperature-based throttle setpoint delta with the current throttle setpoint of the internal-combustion engine 130 in order to calculate a new target throttle setpoint for the internal-combustion engine 130. In one example, the local controller 160: sums the efficiency-based throttle setpoint delta, the charge-based throttle setpoint delta, the temperature-based throttle setpoint delta, and the current throttle setpoint of the internal-combustion engine 130 to calculate the new target throttle setpoint delta for the current command cycle.

In another implementation, the local controller 160 weights these throttle setpoint deltas. For example, the local controller 160 can: weight the efficiency-based throttle setpoint delta inversely proportional to the current fuel fill level of the aerial vehicle; weight the charge-based throttle setpoint delta proportional to the current payload carried by the aerial vehicle; and then sum the weighted efficiency-based throttle setpoint delta, the weighted charge-based throttle setpoint delta, and the current throttle setpoint of the internal-combustion engine 130 to calculate the new target throttle setpoint delta for the current command cycle.

The local controller 160 can then drive a throttle actuator—coupled to the internal-combustion engine 130—to this new target throttle setpoint in Block S136.

9.8 Torque-Based Closed-Loop Controls

In one implementation, the local controller 160 implements closed-loop controls to vary the throttle setpoint of the internal-combustion engine 130 and the power output of the primary electric motor 110 to maintain the rotor 120 at a target rotor speed based on a torque output of the internal-combustion engine 130 at a target engine efficiency at the corresponding engine speed, an estimated torque output of the primary electric motor no, and an estimated torque input to the rotor 120 to maintain this rotor speed.

For example, the local controller 160 can: receive a target rotor speed from the primary flight controller 180; or calculate a target rotor speed based on a total thrust value or an uncorrected rotor speed received from the primary flight controller 180, such as described below. The local controller 160 can then: calculate a target engine speed corresponding to the target rotor speed (e.g., based on a known gear or pulley ratio between the internal-combustion engine 130 output shaft 134 and the rotor 120); and reference the internal-combustion engine 130 efficiency curve described above to calculate a target engine torque corresponding to target (e.g., maximum) engine efficiency at the target engine speed. The local controller 160 can similarly: store a rotor input torque curve (or "map") that predicts a torque required to rotate the rotor 120 at a particular rotor speed, such as based on altitude, barometric pressure, and/or humidity; and reference this rotor input torque curve to estimate a rotor input torque necessary to rotate the rotor 120 at the target rotor speed (e.g., based on the current altitude of the aerial vehicle, a current barometric pressure, and/or a current humidity). The local controller 160 can also estimate a current motor torque output by the primary electric motor 110 based on a current supplied to the primary electric motor 110 (e.g., measured by an ammeter connected to the primary electric motor 110), the voltage across the primary electric motor 110, and/or the resistance of the primary electric motor 110.

Then, in response to the target engine torque exceeding the estimated rotor input torque, the local controller 160 can: transition the primary electric motor 110 to the regenerative braking state; implement closed-loop controls to adjust the braking rate of the primary electric motor 110 on short time intervals (e.g., 100 milliseconds, 500 milliseconds) to regeneratively brake the rotor 120 to the target rotor speed; and implement closed-loop controls to adjust the throttle setpoint of the internal-combustion engine 130 on longer time intervals (e.g., one second, two seconds) to maintain the motor torque of the primary electric motor 110—opposite the direction of rotation of the rotor 120—at (or near, proximal) a difference between the target engine torque and the rotor input torque. The local controller 160 can thus brake the primary electric motor 110 at different rates and adjust the throttle setpoint of the internal-combustion engine 130 in order to match the torque of the primary electric motor 110—resisting rotation of the rotor 120—to the difference between a) the estimated torque necessary to rotate the rotor 120 at the target speed and b) the target engine torque, thereby maintaining the rotor 120 at the target rotor speed, maintaining the internal-combustion engine 130 within a target operating efficiency range, and recharging the battery 194 in the aerial vehicle.

Similarly, in response to the estimated rotor input torque exceeding the target engine torque, the local controller 160 can: transition the primary electric motor 110 to the power output state; implement closed-loop controls to drive the primary electric motor 110 to output torque, in the direction of rotation of the rotor 120, to advance the rotor 120 to the target rotor speed on short time intervals; and implement closed-loop controls to adjust the throttle setpoint of the internal-combustion engine 130 on longer time intervals to maintain the motor torque of the primary electric motor 110—in the direction of rotation of the rotor 120—at (or near, proximal) the difference between the target engine torque and the rotor input torque. The local controller 160 can thus drive the primary electric motor 110 at different output torques and adjust the throttle setpoint of the internal-combustion engine 130 in order to match the torque output by the primary electric motor 110—in the direction of rotation of the rotor 120—to the difference between a) the estimated torque necessary to rotate the rotor 120 at the target speed and b) the target engine torque, thereby maintaining the rotor 120 at the target rotor speed and maintaining the internal-combustion engine 130 within the target operating efficiency range while discharging the battery 194 in the aerial vehicle.

9.9 Engine Cooling

In one implementation as shown in FIG. 5, the local controller 160 also implements closed-loop controls to vary the speed of the cooling fan 156 as a function of (e.g., proportional to) the temperature of the internal-combustion engine 130. For example, if the current temperature of the internal-combustion engine 130 exceeds the target operating temperature of the internal-combustion engine 130, the local controller 160 can increase the speed of the cooling fan 156; and vice versa. Furthermore, the local controller 160 can feed a total throttle setpoint delta for the current command cycle forward into the closed-loop control of the cooling fan 156 in order to preemptively adjust airflow through the engine shroud 150 as a function of (e.g., proportional) an anticipated future change in the temperature of the internal-combustion engine 130 following implementation of this total throttle setpoint delta for the current command cycle. For example, the local controller 160 can reduce the cooling fan speed—and thus reduce airflow over the internal-combustion engine 130—if the total throttle setpoint delta is negative for the current command cycle; and vice versa.

10. Secondary Thrust

Generally, because the shroud outlet 154 of the engine shroud 150 is parallel to the axis of rotation of the rotor 120, air flowing through the engine shroud 150 may impart additional thrust parallel and complementary to thrust produced by the rotor 120, as shown in FIG. 1. In one example: the motor and the internal-combustion engine 130 is arranged below the rotor 120; the shroud inlet 152 is interposed between the cylinder head 132 and the rotor 120; and the shroud outlet 154 is arranged below the cylinder head 132 and faces opposite the rotor 120 to direct air—drawn through the shroud inlet 152 between the cylinder head 132 and the rotor 120—downward to produce a secondary thrust, such as approximately parallel to the primary thrust generated by the rotor 120 above.

Furthermore, the cooling fan 156 may be significantly smaller—and therefore exhibit (much) less angular inertial—than the rotating assembly of the rotor 120, the primary electric motor 110, and the internal-combustion engine 130. Thus, the system 100 can increase the speed of the cooling fan 156- and thus increase thrust output from the engine shroud 150—at a rate greater than the rotor 120, primary electric motor 110, and internal-combustion engine 130 (though the maximum thrust output of the cooling fan 156 and shroud may be much less than the maximum thrust output of the rotor 120).

Therefore, in response to a rotor speed command specifying a new target rotor speed in excess of the current rotor speed, the local controller 160 can automatically increase the speed of the cooling fan 156 in order to rapidly increase total thrust output of the system 100 as the electronic motor speed controller drives the primary electric motor 110 to this new target rotor speed. For example, the new target rotor speed received from the primary flight controller 180 may represent a command for increased total thrust output by the system 100. To achieve a rapid change in the total thrust output of the system 100 on very short timescales (e.g., milliseconds or tens of milliseconds), the local controller 160 can automatically increase the speed of the cooling fan 156 (e.g., to its maximum speed) in order to rapidly increase thrust output from the engine shroud 150 (e.g., within tens of milliseconds) as the electronic motor speed controller increases the speed of the primary electric motor 110 to its new target rotor speed (e.g., within hundreds of milliseconds). Over subsequent command cycles, the local controller 160 can reduce the speed of the cooling fan 156—such as back to a speed proportional (e.g., "matched") to the temperature of the internal-combustion engine 130—as the speed of the primary electric motor 110 and the rotor 120 approaches the last target rotor speed and/or as the thrust generated by the rotor 120 approaches a total target thrust represented by this target rotor speed.

10.1 Total Thrust

In this variation, the local controller 160 can receive commands specifying target total thrusts from the primary light controller. The local controller 160 can then implement methods and techniques described below to calculate rotor and cooling fan speeds to achieve these target total thrusts. For example, the local controller 160 can store a local copy of a parametric model or lookup table; to calculate a target rotor speed, the local controller 160 can insert a target total thrust, a current cooling fan speed, a current altitude of the aerial vehicle, a humidity, and/or a barometric pressure into the parametric model or lookup table, which returns a target rotor speed.

Alternatively, the local controller 160 can receive rotor speed commands —specifying uncorrected rotor speeds— from the primary flight controller 180. The local controller 160 can then calculate a target total thrust based on the uncorrected rotor speed and calculate a target rotor speed (e.g., based on the current cooling fan speed, the current altitude of the aerial vehicle, the local humidity, and/or the local barometric pressure) based on this target total thrust, such as described above.

However, the local controller 160 can implement any other method or technique to calculate total or partial thrust outputs of the rotor 120 and cooling fan 156 and/or to calculate target speeds of the rotor 120 and the cooling fan 156 based on a command received from the primary flight controller 180.

10.2 Secondary Thrust: Cooling Fan

During operation, the local controller 160 can: read a temperature of the internal-combustion engine 130 from a temperature sensor 162 coupled to the internal-combustion engine 130; calculate a cooling fan speed proportional to the temperature of the internal-combustion engine 130; and drive the cooling fan 156 to this cooling fan speed or drive this cooling fan 156 to an average of this cooling fan speed over a long time interval (e.g., 30 seconds) with high-frequency cooling fan speed variations to "trim" the total thrust output of the system 100.

The local controller 160 can also estimate the secondary thrust—output from the shroud outlet 154—based on the cooling fan speed of the cooling fan 156. For example, the local controller 160 can pass the current cooling fan speed, the current altitude of the aerial vehicle, the local humidity, and/or the local barometric pressure into the cooling fan 156 model, which returns a secondary thrust estimate based on these values. Furthermore, the local controller 160 can calculate vertical and horizontal (or yaw, roll) thrust components of the secondary thrust based on a known angular offset between the shroud outlet 154 and the rotor 120.

10.3 Primary Thrust: Rotor

Similarly, the local controller 160 can estimate the primary thrust—output by the rotor 120—based on the rotor speed. For example, the local controller 160 can pass the current rotor speed, the current altitude of the aerial vehicle, the local humidity, and/or the local barometric pressure into the rotor model, which returns a primary thrust estimate based on these values.

10.4 Rotor/Cooling Fan Compensation

In one implementation, the local controller 160 adjusts the target speed of the rotor 120—and thus the primary thrust generated by the rotor 120—to compensate for changes in speed of the rotor 120 responsive to changes in temperature of the internal-combustion engine 130 (e.g., over longer time intervals).

For example, during a first time period, the local controller 160 can: receive a target total thrust from the primary flight controller 180; estimate a secondary thrust output by the cooling fan 156 and engine shroud 150 based on the first speed of the cooling fan 156 at the current time; calculate a target primary thrust from the rotor 120 based on a difference between the target total thrust and the secondary thrust; and calculate a target rotor speed for the first time period based on the target primary thrust. The local controller 160 can then: drive the primary electric motor 110 to the target rotor speed over a first time interval (e.g., 500 milliseconds); and adjust the throttle setpoint of the internal-combustion engine 130 according to the target rotor speed over a second time interval (e.g., one second, two seconds). Over a subsequent time period, the local controller 160 can: detect an increase in a temperature of the internal-combustion engine 130; drive the cooling fan 156 to a second cooling fan speed greater than the first cooling fan speed based on (e.g., proportional to) the current temperature of the internal-combustion engine 130; estimate a new secondary thrust, output from the shroud outlet 154, based on the second cooling fan speed of the cooling fan 156; calculate a new target primary thrust from the rotor 120 based on a difference between the target total thrust and the new secondary thrust; and calculate a new target rotor speed for the second time period based on the new target primary thrust. The local controller 160 can then: adjust the throttle setpoint of the internal-combustion engine 130 according to the new target rotor speed; and drive the primary electric motor 110 to selectively output torque to the rotor 120 and regeneratively brake the rotor 120 according to the second target rotor speed.

10.5 Secondary Thrust Vectoring

In one variation shown in FIG. 1, the system 100 further includes an adjustable nozzle 158, and the local controller 160 implements thrust-vectoring techniques to adjust the orientation of the adjustable nozzle 158 to direct secondary thrust output from the shroud outlet 154 in different orientations (e.g., along different pitch and/or yaw directions) relative to the rotor 120.

In one example: the internal-combustion engine 130 is arranged below the rotor 120; the shroud inlet 152 is interposed between the cylinder head 132 and the rotor 120; the shroud outlet 154 is arranged below the cylinder head 132 and faces opposite the rotor 120; and the system 100 further includes a nozzle 158 coupled to shroud outlet 154 and a nozzle actuator 159 configured to drive the nozzle 158 over a range of (pitch and/or yaw) orientations. In this implementation, the local controller 160 can drive the nozzle actuator 159 to locate the nozzle 158 in a nominal orientation to output the secondary thrust approximately parallel to the primary thrust generated by the rotor 120—that is, a "0°" orientation that locates the axis of the nozzle 158 parallel to the rotational axis of the rotor 120. Then, in response to receiving, from the primary flight controller 180, a command that indicates a target total thrust that includes a yaw thrust component, the local controller 160 can: drive the nozzle actuator 159 to locate the nozzle 158 in a yaw orientation (e.g., a 30° yaw orientation, a 90° yaw orientation; and drive the cooling fan 156 to a new cooling fan speed based on the yaw orientation of the nozzle 158 and the yaw thrust component such that the secondary thrust output from the nozzle 158 in the yaw direction approximates the yaw thrust component specified in the command.

In this example, the local controller 160 can concurrently: calculate a target rotor speed of the rotor 120 based on the target total thrust specified in the command and a component of the secondary thrust output from the nozzle 158 parallel to the primary thrust generated by the rotor 120; adjust the throttle setpoint of the internal-combustion engine 130 according to this new target rotor speed; and drive the primary electric motor 110 to selectively output torque to the rotor 120 and regeneratively brake the rotor 120 according to this new target rotor speed, as described above.

Alternatively, a first instance of the system 100 can include a fixed nozzle arranged at a preset angle (e.g., a positive yaw orientation) and paired with a second instance of the system 100 with a fixed nozzle arranged in a complementary angle (e.g., a negative yaw orientation). During operation, the primary flight controller 180 can: command these instances of the system 100 to rotate their rotors at similar speeds to achieve a null yaw rate; command the first instance of the system 100 to rotate its rotor faster than the second instance to achieve a positive yaw rate; and command the second instance of the system 100 to rotate its rotor faster than the first instance to achieve a negative yaw rate.

11. Thrust Control Interval

Generally, for the implementation described above in which the system 100 controls total thrust output based on the angular speed of the rotor 120, the local controller 160 can execute: high-frequency, short-time-domain rotor speed adjustments —and therefore high-frequency, short-time-domain changes in total thrust output—by selectively braking and driving the primary electric motor 110; and low-frequency, long-time-domain changes in rotor speed by modulating the throttle setpoint of the internal-combustion engine 130.

In one implementation, upon receiving a target rotor speed from the primary flight controller 180, the local controller 160 reads a current rotor speed of the rotor 120. In response to the current rotor speed exceeding the target rotor speed, the local controller 160: drives the primary electric motor 110 in a braking configuration (e.g., in a regenerative braking state) to slow the rotor 120 to the target rotor speed over a first time interval (e.g., 100 microseconds per rotation per minute change in angular speed of the rotor 120); and reduces the throttle setpoint of the internal-combustion engine 130 to reduce torque output of the internal-combustion engine 130 over a second time interval (e.g., two seconds) longer than the first time interval. Similarly, in response to the target rotor speed exceeding the current rotor speed, the local controller 160 can: drive the primary electric motor 110—in a torque output configuration—to advance the rotor 120 to the target rotor speed over a third time interval (e.g., 100 microseconds per rotation per minute change in angular speed of the rotor 120); and increase the throttle setpoint of the internal-combustion engine 130 to increase torque output of the internal-combustion engine 130 over a fourth time interval (e.g., two seconds) longer than the third time interval.

In this example, the local controller 160 can also read a current battery state of charge of a battery 194 arranged in the aerial vehicle. Once the current rotor speed approximates the target rotor speed, the local controller 160 can: increase the throttle setpoint of the internal-combustion engine 130 to increase torque output of the internal-combustion engine 130; and drive the primary electric motor 110 to regeneratively brake the rotor 120, recharge the battery 194, and maintain rotation of the rotor 120 at the target rotor speed if the current battery state of charge falls below a target battery state of charge. Similarly, once the current rotor speed approximates the target rotor speed, the local controller 160 can: decrease the throttle setpoint of the internal-combustion engine 130 to decrease torque output of the internal-combustion engine 130; and drive the primary electric motor 110 with energy from the battery 194 to output torque to the rotor 120 and maintain rotation of the rotor 120 at the target rotor speed if current battery state of charge exceeds the target battery state of charge.

11.1 Cooling Fan+Rotor Thrust

In this similar implementation in which the system 100 controls total thrust output based on both the speed of the rotor 120 and the speed of the cooling fan 156, the local controller 160 can execute: small-amplitude, high-frequency, very-short-time-domain adjustments (or "corrections") to total thrust output of the system 100 by changing the speed of the cooling fan 156; high-amplitude, moderate-frequency, moderate-time-domain adjustments to total thrust output of the system 100 by selectively braking and driving the primary electric motor 110; and high-amplitude, low-frequency, long-time-domain adjustments to total thrust output of the system 100 by adjusting the throttle setpoint of the internal-combustion engine 130.

For example, the system 100 can achieve up to a 10-Newton increase in the secondary thrust from the cooling fan 156 within 100 milliseconds by increasing the speed of the cooling fan from 50% to 100% of maximum speed. Furthermore, because the internal-combustion engine 130 is characterized by a relatively large thermal mass, large increases and decreases in cooling fan speed—and therefore large increases and decreases in air flow over the internal-combustion engine 130—may yield negligible changes in the temperature of the internal-combustion engine 130 over short time periods (e.g., less than five seconds). However, driving the cooling fan 156 at 100% of maximum speed for longer durations (e.g., more than ten seconds) if not accompanied by a large increase in load and throttle setpoint of the internal-combustion engine 130 may cool the internal-combustion engine 130 too rapidly and drive the temperature of the internal-combustion engine 130 below its target operating temperature.

In this example, the system 100 can achieve up to a 250-Newton increase in the primary thrust generated by the rotor 120 within 500 milliseconds by increasing the speed of the primary electric motor 110 from 50% to 100% of its maximum speed. However, the battery 194 in the aerial vehicle may be sized to power a single primary electric motor 110 at 100% of its maximum speed (or to power the rotor 120 to 25% of the total weight of the aerial vehicle) for a limited duration (e.g., up to five minutes).

Furthermore, in this example, the system 100 can achieve up to a 250-Newton increase in the primary thrust generated by the rotor 120 within 2000 milliseconds by increasing the throttle setpoint of the internal-combustion engine 130 from 50% to 100%, and the aerial vehicle can carry sufficient fuel onboard to power a single internal-combustion engine 130 at 100% throttle (and under load) for a much longer duration (e.g., 30 minutes).

Therefore, the local controller 160 can: modulate the cooling fan speed over very short time intervals (e.g., milliseconds) and over very brief durations of time (e.g., less than five seconds) to achieve rapid, small-amplitude changes in total thrust output of the system 100; modulate braking and torque output of the primary electric motor 11o over short time intervals (e.g., 500 milliseconds) and over short durations of time (e.g., less than 30 seconds) to achieve large, fast changes in total thrust output of the system 100; and modulate the throttle setpoint of the internal-combustion engine 130 over longer time intervals (e.g., two seconds) and over long durations of time (e.g., minutes or hours) to maintain large, consistent total thrust outputs of the system 100.

In another example, after receiving or calculating a target rotor speed based on a command received from the primary flight controller 180, the local controller 160 can read a current rotor speed of the rotor 120 and a current battery state of charge of the battery 194 in the aerial vehicle. Then, in response to the target rotor speed exceeding the current rotor speed, the local controller 160 can: increase the cooling fan speed of the cooling fan 156 to increase the second thrust over a first time interval; drive the primary electric motor 110 to advance the rotor 120 to the target rotor speed over a second time interval longer than the first time interval; and increase the throttle setpoint to increase torque output of the internal-combustion engine 130 over a third time interval longer than the second time interval. Furthermore, once the current rotor speed reaches (e.g., falls within 1% of) the target rotor speed, the local controller 160 can: increase the throttle setpoint to increase torque output of the internal-combustion engine 130; and drive the primary electric motor 110 to regeneratively brake the rotor 120, recharge the battery 194, and maintain rotation of the rotor 120 at the target rotor speed in response to the target battery state of charge exceeding the current battery state of charge. Conversely, in response to the current battery state of charge exceeding a target battery state of charge, the local controller 160 can: decrease the throttle setpoint to decrease torque output of the internal-combustion engine 130; and drive the primary electric motor 110 with energy from the battery 194 to selectively output torque to the rotor 120 and maintain rotation of the rotor 120 at the target rotor speed.

12. Variable-Pitch Rotor

In one variation described above, the rotor 120 includes a variable-pitch propeller. In this variation, the local controller 160 can receive a thrust command specifying a target total thrust from the primary flight controller in Block Silo and can estimate an instantaneous thrust generated by the rotor 120, such as: by querying a lookup table for a thrust value based on the current blade pitch, the current rotor speed, and the current altitude of the aerial vehicle; or by implementing a parametric thrust model to transform the current blade pitch, the current rotor speed, and the current altitude of the aerial vehicle into a current thrust value. The local controller 160 can then: calculate a difference between the target total thrust and the actual thrust generated by the rotor 120; and calculate a blade pitch delta proportional to this difference. For example, if this difference is positive, the local controller 160 can calculate a positive blade pitch delta, which may increase thrust output of the rotor 120 given a constant rotor speed; conversely, if this difference is negative, the local controller 160 can calculate a negative blade pitch delta, which may decrease thrust output of the rotor 120 given a constant rotor speed. The local controller 160 and then output a command to a blade actuator—coupled to a blade pitch control on the rotor 120—to adjust blades of the rotor 120 according to this blade pitch delta.

Concurrently, the local controller 160 can output a command to the electronic motor speed controller to maintain the current rotor speed. For example, if the blade pitch delta is positive, the rotor 120 may require more torque to maintain its current speed. Therefore, the electronic motor speed controller can increase a voltage applied to the primary electric motor 110 in order to increase torque output of the primary electric motor 110 (i.e., on a shorter timescale than torque increases output by the internal-combustion engine 130). Conversely, if the blade pitch delta is negative, the rotor 120 may require less torque to maintain the current speed. Therefore, the electronic motor speed controller can regeneratively brake the primary electric motor no in order to rapidly reduce the speed of the rotor 120 (i.e., on a shorter timescale than friction-based speed losses).

Furthermore, during this command cycle, the local controller 160 can: estimate the current torque output of the internal-combustion engine 130; calculate a positive efficiency-based throttle setpoint delta if the current torque output of the internal-combustion engine 130 is less than a target torque corresponding to a peak efficiency of the internal-combustion engine 130 at or near the current engine speed; and calculate a negative efficiency-based throttle setpoint delta if the current torque output of the internal-combustion engine 130 is more than this target torque. The local controller 160 can then: retrieve a current battery state of charge; calculate a positive charge-based throttle setpoint delta if the current state of charge is less than a target state of charge; and calculate a negative charge-based throttle setpoint delta if the current state of charge is more than the target state of charge. The local controller 160 can then implement methods and techniques described above to merge these throttle setpoint deltas into a new throttle setpoint for the internal-combustion engine 130 and to drive the throttle actuator to this new throttle setpoint during the current command cycle.

Given small or null changes in target total thrust specified by the primary flight controller over subsequent command cycles, the local controller 160 can: estimate the current thrust output of the rotor 120; calculate a blade pitch delta that returns the blade pitch of the rotor 120 back to a center (or "nominal") position that enables both large increases and large decreases in blade pitch—and therefore enables increases and decreases in thrust output of the rotor 120 over short timescales—responsive to a next thrust command; calculate a new rotor speed that maintains the current thrust output of the rotor 120 when this blade pitch delta is applied to the rotor 120 (e.g., based on the lookup table or parametric thrust model described above); output a command to the blade actuator to adjust the pitch of the rotor 120 blades according to this blade pitch delta; output a command to the electronic motor speed controller to drive the primary electric motor 110 to this new rotor speed; and implement methods and techniques described above to adjust the throttle setpoint of the internal-combustion engine 130 to maintain the internal-combustion engine 130 near a peak operating efficiency for this rotor speed and to maintain the state of charge of the battery 194. In particular, the local controller 160 can execute closed-loop controls to implement this process to adjust the blade pitch delta back to a nominal position—while maintaining the charge state of the battery 194, the efficiency of the internal-combustion engine 130, and the temperature of the internal-combustion engine 130 within narrow target ranges—over multiple seconds and/or over multiple command cycles.

In this variation, the local controller 160 can also implement methods and techniques described above to selectively adjust the speed of the cooling fan 156 proportional to changes in target total thrust specified in thrust commands received from the primary flight controller in order to rapidly achieve relatively small changes in total thrust output by the system 100 while the local controller 160 drives the larger components of the system 100 (i.e., the rotor 120, the primary electric motor 110, and the internal-combustion engine 130) to new positions or states over longer time scales responsive to such thrust commands.

12.1 Example: Variable-Pitch Rotor

In one implementation of the system 100 that includes a variable-pitch rotor and a blade actuator, the local controller 160 implements methods and techniques described above to: receive or calculate a target total thrust based on a command received from the primary flight controller 180; monitor a temperature of the internal-combustion engine 130; set a speed of the cooling fan 156 based on (e.g., proportional to) the internal-combustion engine 130 temperature; estimate the secondary thrust output by the cooling fan 156 and the engine shroud 150 based on this cooling fan speed; monitor the current speed of the rotor 120; and calculate a target primary thrust—generated by the rotor 120—based on a difference between the target total thrust and the secondary thrust.

In this implementation, the local controller 160 can also store a rotor thrust map that associates speed and pitch of the rotor 120 with thrust generated by the rotor 120. For example, the rotor thrust map can include: a set of pitch versus speed curves, including one curve for each rotor thrust or rotor thrust range; or a 3D surface representing combinations of rotor pitch, rotor speed, and thrust output values. The local controller 160 can therefore select or extract a pitch versus speed curve—from the thrust map—that represents combinations of rotor pitch and speed values predicted to yield the target primary thrust.

The local controller 160 can then: select a target rotor speed matched to the current pitch of the rotor 120 in this pitch versus speed curve; implement methods and techniques described above to selectively drive or brake the primary electric motor 110 to this target rotor speed over a short time interval (e.g., 500 milliseconds); and adjust the throttle setpoint of the internal-combustion engine 130 to reduce power output or braking load on the primary electric motor 110 while maintaining this target rotor speed over a longer time interval. The local controller 160 can also implement methods and techniques described above: to estimate a target torque output of the internal-combustion engine 130 that corresponds to a target (e.g., maximum) engine efficiency at this target rotor speed; to estimate the current torque output of the internal-combustion engine 130; and to track the state of charge of the battery 194.

Then, if the current torque output of the internal-combustion engine 130 is less than the target engine torque and the battery state of charge is low (e.g., near or below the target battery state of charge), the local controller 160 can: increase the throttle setpoint of the internal-combustion engine 130; and reduce the power output of the primary electric motor 110 or transition the primary electric motor 110 into the regenerative braking state to recharge the battery 194.

Alternatively, if the current torque output of the internal-combustion engine 130 is less than the target engine torque and the battery state of charge is high (e.g., near or above the target battery state of charge), the local controller 160 can: reduce the target rotor speed; trigger the blade actuator to increase the rotor pitch (e.g., by a pitch step change of 0.5°); reduce the throttle setpoint of the internal-combustion engine 130; and increase the power output of the primary electric motor 110 (or reduce regenerative braking of the primary electric motor 110).

Yet alternatively, if the current torque output of the internal-combustion engine 130 is greater than the target engine torque and the battery state of charge is high (e.g., near or above the target battery state of charge), the local controller 160 can: decrease the throttle setpoint of the internal-combustion engine 130; and increase the power output of the primary electric motor 110 (or reduce regenerative braking of the primary electric motor 110).

Furthermore, if the current torque output of the internal-combustion engine 130 is greater than the target engine torque and the battery state of charge is low (e.g., near or below the target battery state of charge), the local controller 160 can: increase the target rotor speed; trigger the blade actuator to decrease the rotor pitch; increase the throttle setpoint of the internal-combustion engine 130; and decrease the power output of the primary electric motor 110 (or increase regenerative braking of the primary electric motor 110).

The local controller 160 can repeat this process throughout operation, such as at a rate of 20 Hz while in flight.

Therefore, in this example, the local controller 160 can implement closed-loop controls to adjust the pitch of the rotor 120 based on: a target rotor speed or target total thrust specified by the primary flight controller 180; the state of charge of the battery 194; and the estimated efficiency of the internal-combustion engine 130.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A system for generating thrust at an aerial vehicle comprising:
   a primary electric motor comprising a motor output;
   a rotor coupled to the motor output and configured to generate a first thrust;
   an internal-combustion engine comprising a cylinder head and an output shaft coupled to the rotor;
   an engine shroud defining a shroud inlet between the rotor and the internal-combustion engine, extending over the cylinder head, and defining a shroud outlet opposite the rotor;
   a cooling fan coupled to the engine shroud and configured to displace air through the engine shroud to cool the cylinder head and output a second thrust, from the shroud outlet, to augment the first thrust;
   a local controller configured to:
      access a target total thrust;
      estimate the second thrust, output from the shroud outlet, based on a cooling fan speed of the cooling fan;
      calculate a target rotor speed of the rotor based on the target total thrust and the second thrust;
      adjust a throttle setpoint of the internal-combustion engine according to the target rotor speed; and
      drive the primary electric motor to selectively output torque to the rotor and regeneratively brake the rotor according to the target rotor speed.

2. The system of claim 1:
   further comprising a temperature sensor coupled to the internal-combustion engine; and
   wherein the local controller is further configured to:
      receive a rotor speed command from a primary flight controller in the aerial vehicle, the rotor speed command specifying an uncorrected rotor speed;
      calculate the target total thrust based on the uncorrected rotor speed;
      read a temperature of the internal-combustion engine from the temperature sensor; and
      calculate the cooling fan speed proportional to the temperature of the internal-combustion engine.

3. The system of claim 1:
   further comprising:
      a clutch interposed between the output shaft and the motor output and configured to selectively transfer torque between the output shaft and the motor output; and
      a clutch actuator coupled to the clutch; and
   wherein the local controller is further configured to:
      during a start cycle:
         trigger the clutch actuator to engage the clutch; and
         actuate the primary electric motor to start the internal-combustion engine; and
      in response to detecting a failure at the internal-combustion engine:
         trigger the clutch actuator to disengage the clutch; and
         drive the primary electric motor to increase torque output by the primary electric motor to the rotor.

4. The system of claim 1, wherein the local controller is configured to adjust the throttle setpoint and drive the primary electric motor according to the target rotor speed by:
   reading a current rotor speed of the rotor;
   in response to the current rotor speed exceeding the target rotor speed:
      driving the primary electric motor in a braking configuration to slow the rotor to the target rotor speed over a first time interval; and
      reducing the throttle setpoint to reduce torque output of the internal-combustion engine over a second time interval longer than the first time interval; and
   in response to the target rotor speed exceeding the current rotor speed:

driving the primary electric motor to advance the rotor to the target rotor speed over a third time interval; and increasing the throttle setpoint to increase torque output of the internal-combustion engine over a fourth time interval longer than the third time interval.

5. The system of claim 1, wherein the local controller is configured to adjust the throttle setpoint and drive the primary electric motor according to the target rotor speed by, during a first time period:

reading a current rotor speed of the rotor; and in response to the target rotor speed exceeding the current rotor speed:

increasing the cooling fan speed of the cooling fan to increase the second thrust over a first time interval;

driving the primary electric motor to advance the rotor to the target rotor speed over a second time interval longer than the first time interval; and increasing the throttle setpoint to increase torque output of the internal-combustion engine over a third time interval longer than the second time interval.

6. The system of claim 5, wherein the local controller is further configured to, during a second time period succeeding the first time period:

read a second current rotor speed of the rotor;

read a current battery state of charge of a battery arranged in the aerial vehicle;

in response to the second current rotor speed approximating the target rotor speed:

in response to a target battery state of charge exceeding the current battery state of charge:

increase the throttle setpoint to increase torque output of the internal-combustion engine; and drive the primary electric motor to regeneratively brake the rotor, recharge the battery, and maintain rotation of the rotor at the target rotor speed; and in response to the current battery state of charge exceeding the target battery state of charge:

decrease the throttle setpoint to decrease torque output of the internal-combustion engine; and drive the primary electric motor with energy from the battery to selectively output torque to the rotor and maintain rotation of the rotor at the target rotor speed.

7. The system of claim 1:

wherein the local controller is further configured to:

calculate a target engine speed corresponding to the target rotor speed;

calculate a target engine torque corresponding to target engine efficiency at the target engine speed;

estimate a rotor input torque to rotate the rotor at the target rotor speed; and estimate a current motor torque output by the primary electric motor; and wherein the local controller is configured to adjust the throttle setpoint and drive the primary electric motor according to the target rotor speed by:

in response to the target engine torque exceeding the rotor input torque:

driving the primary electric motor to regeneratively brake the rotor to the target rotor speed; and adjusting the throttle setpoint of the internal-combustion engine to maintain the current motor torque, opposite a direction of rotation of the rotor, proximal a difference between the target engine torque and the rotor input torque while the rotor rotates at the target rotor speed; and in response to the rotor input torque exceeding the target engine torque:

driving the primary electric motor to output torque, in the direction of rotation of the rotor, to advance the rotor to the target rotor speed; and adjusting the throttle setpoint of the internal-combustion engine to maintain the current motor torque, in the direction of rotation of the rotor, proximal a difference between the target engine torque and the rotor input torque while the rotor rotates at the target rotor speed.

8. The system of claim 1:

further comprising a mount;

wherein the primary electric motor is fixed to the mount;

wherein the internal-combustion engine is fixed to the mount;

wherein the local controller is fixed to the mount; and wherein the mount is configured to transiently couple to a boom of the aerial vehicle and to locate the rotor in a vertical orientation on the boom.

9. The system of claim 1:

wherein the motor is arranged below the rotor;

wherein the internal-combustion engine is arranged below the rotor;

wherein the shroud inlet is interposed between the cylinder head and the rotor; and wherein the shroud outlet is arranged below the cylinder head and faces opposite the rotor to direct air, drawn through the shroud inlet between the cylinder head and the rotor, downward to produce the second thrust approximately parallel to the first thrust generated by the rotor.

10. The system of claim 1:

wherein the internal-combustion engine is arranged below the rotor;

wherein the shroud inlet is interposed between the cylinder head and the rotor; and wherein the shroud outlet is arranged below the cylinder head and faces opposite the rotor;

further comprising:

a nozzle coupled to the shroud outlet; and a nozzle actuator configured to drive the nozzle over a range of orientations; and wherein the local controller is further configured to:

during a first time period, drive the nozzle actuator to locate the nozzle in a nominal orientation to output the second thrust approximately parallel to the first thrust generated by the rotor; and during a second time period:

access a second target total thrust specifying a yaw thrust component;

drive the nozzle actuator to locate the nozzle in a yaw orientation according to the yaw thrust component;

drive the cooling fan to a second cooling fan speed based on the yaw orientation of the nozzle and the yaw thrust component;

calculate a second target rotor speed of the rotor based on the second target total thrust and the second thrust output from the nozzle parallel to the first thrust;

adjust the throttle setpoint of the internal-combustion engine according to the second target rotor speed; and drive the primary electric motor to selectively output torque to the rotor and regeneratively brake the rotor according to the second target rotor speed.

11. The system of claim 1, wherein the local controller is configured to:
 during a first time period:
  access the target total thrust;
  calculate the target rotor speed for the first time period;
  drive the primary electric motor to the target rotor speed; and
  adjust the throttle setpoint of the internal-combustion engine according to the target rotor speed; and
 over a second time period succeeding first time period:
  detect an increase in a temperature of the internal-combustion engine;
  drive the cooling fan to a second cooling fan speed greater than the cooling fan speed based on the temperature of the internal-combustion engine;
  estimate a third thrust, output from the shroud outlet, based on the second cooling fan speed of the cooling fan;
  calculate a second target rotor speed of the rotor, less than the target rotor speed, based on the target total thrust and the third thrust;
  adjust the throttle setpoint of the internal-combustion engine according to the second target rotor speed; and
  drive the primary electric motor to selectively output torque to the rotor and regeneratively brake the rotor according to the second target rotor speed.

12. The system of claim 1:
 further comprising:
  a chassis defining a first power unit location and a second power unit location; and
  a second power unit mounted to the chassis at the second power unit location and comprising:
   a second primary electric motor comprising a second motor output;
   a second rotor coupled to the second motor output and configured to generate a third thrust;
   a second internal-combustion engine comprising a second cylinder head and a second output shaft coupled to the second rotor;
   a second engine shroud defining a second shroud inlet between the second rotor and the second internal-combustion engine, extending over the second cylinder head, and defining a second shroud outlet opposite the second rotor;
   a second cooling fan coupled to the second engine shroud and configured to displace air through the second engine shroud to cool the second cylinder head and output a fourth thrust, from the second shroud outlet, to augment the third thrust; and
   a second local controller configured to:
    access a second target total thrust based on a second flight command received from the primary flight controller;
    estimate the fourth thrust, output from the second shroud outlet, based on a second cooling fan speed of the second cooling fan;
    calculate a second target rotor speed of the second rotor based on the second target total thrust and the fourth thrust;
    adjust a second throttle setpoint of the second internal-combustion engine according to the second target rotor speed; and
    drive the second primary electric motor to selectively output torque to the second rotor and regeneratively brake the second rotor according to the second target rotor speed; and
 wherein the primary electric motor, the rotor, the internal-combustion engine, the engine shroud, the cooling fan, and the local controller form a first power unit mounted to the chassis at the first power unit location.

\* \* \* \* \*